(12) United States Patent
Li et al.

(10) Patent No.: US 10,904,764 B2
(45) Date of Patent: *Jan. 26, 2021

(54) SECURITY PROTECTION METHOD AND APPARATUS

(71) Applicant: Huawei Technologies Co., Ltd., Shenzhen (CN)

(72) Inventors: He Li, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,306

(22) Filed: May 14, 2020

(65) Prior Publication Data

US 2020/0275276 A1    Aug. 27, 2020

Related U.S. Application Data

(63) Continuation of application No. 16/404,163, filed on May 6, 2019, now Pat. No. 10,681,551, which is a
(Continued)

(30) Foreign Application Priority Data

Nov. 17, 2017   (CN) .......................... 2017 1 1148926

(51) Int. Cl.
*H04W 12/10* (2009.01)
*H04W 12/00* (2009.01)
(Continued)

(52) U.S. Cl.
CPC ..... *H04W 12/1006* (2019.01); *H04L 63/0428* (2013.01); *H04L 63/123* (2013.01);
(Continued)

(58) Field of Classification Search
CPC ....... H04W 12/1006; H04W 12/04031; H04W 12/1204; H04W 12/0013; H04L 63/123; H04L 63/0428
(Continued)

(56) References Cited

U.S. PATENT DOCUMENTS

| 2009/0025060 A1* | 1/2009 | Mukherjee | ............ H04W 12/08 726/3 |
| 2012/0129491 A1* | 5/2012 | Prasad | .............. H04W 12/0401 455/410 |

(Continued)

FOREIGN PATENT DOCUMENTS

| CN | 101309500 A | 11/2008 |
| CN | 101378591 A | 3/2009 |

(Continued)

OTHER PUBLICATIONS

3GPP TS 24.301, V15.0.1, Sep. 2017.
(Continued)

*Primary Examiner* — William Nealon
(74) *Attorney, Agent, or Firm* — Conley Rose, P.C.

(57) ABSTRACT

A security protection method and an apparatus to implement security protection for a plurality of non-access stratum (NAS) connection links. The method includes determining, by a terminal, a first parameter, where the first parameter is used to indicate an access technology used to transmit a non-access stratum NAS message. The terminal can support at least two access technologies, and can separately maintain a corresponding NAS COUNT for each of the at least two access technologies. The method further includes performing, by the terminal, security protection on the NAS message based on the first parameter, a NAS key, and a NAS COUNT corresponding to an access technology used to transmit the NAS message.

26 Claims, 10 Drawing Sheets

Related U.S. Application Data continuation of application No. PCT/CN2018/112897, filed on Oct. 31, 2018.

(51) Int. Cl.
*H04L 29/06* (2006.01)
*H04W 12/04* (2009.01)
*H04W 12/12* (2009.01)

(52) U.S. Cl.
CPC . *H04W 12/0013* (2019.01); *H04W 12/04031* (2019.01); *H04W 12/1008* (2019.01); *H04W 12/1204* (2019.01)

(58) Field of Classification Search
USPC ............................................................ 455/411
See application file for complete search history.

(56) References Cited

U.S. PATENT DOCUMENTS

| | | | | |
|---|---|---|---|---|
| 2013/0195268 A1* | 8/2013 | Norrman | ........... | H04W 36/0038 380/247 |
| 2014/0185585 A1* | 7/2014 | Zhang | ............... | H04W 36/0033 370/331 |
| 2015/0208236 A1* | 7/2015 | Xu | ......................... | H04B 1/406 380/270 |
| 2016/0088472 A1* | 3/2016 | He | .......................... | H04L 63/20 713/171 |
| 2018/0220364 A1* | 8/2018 | Li | ..................... | H04W 12/0401 |

FOREIGN PATENT DOCUMENTS

| | | |
|---|---|---|
| CN | 101815296 A | 8/2010 |
| CN | 103002521 A | 3/2013 |
| CN | 103607713 A | 2/2014 |
| CN | 103781069 A | 5/2014 |
| CN | 104067648 A | 9/2014 |
| CN | 104105091 A | 10/2014 |
| CN | 104349317 A | 2/2015 |
| EP | 2400791 A1 | 12/2011 |
| WO | 2014063088 A1 | 4/2014 |
| WO | 2015139721 A1 | 9/2015 |
| WO | 2017049461 A1 | 3/2017 |
| WO | 2018206501 A1 | 11/2018 |

OTHER PUBLICATIONS

3GPP TS 33.401, V15.1.0, Sep. 2017.
3GPP TS 33.501, V0.4.0, Oct. 2017.
"3rd Generation Partnership Project; Technical Specification Group Core Network and Terminals; Non-Access-Stratum (NAS) protocol for 5G System (5GS); Stage 3(Release 15)," 3GPP TS 24.501, V0.1.0, Nov. 2017, 16 pages.
"3rd Generation Partnership Project; Technical Specification Group Services and System Aspects; 3GPP System Architecture Evolution (SAE); Security architecture (Release 11)," 3GPP TS 33.401, V11.5.0, Sep. 2012, 121 pages.
"3rd Generation Partnership Project; Technical Specification Group Services and System Aspects; Security Architecture and Procedures for 5G System (Release 15)," 3GPP TS 33.501, V0.4.0, Oct. 2017, 70 pages.
"3rd Generation Partnership Project; Technical Specification Group Services and System Aspects; 3GPP System Architecture Evolution (SAE);Security architecture (Release 15)," 3GPP TS 33.401, V15.1.0, Sep. 2017, 161 pages.
Ericsson, "Multiple registrations," 3GPP Draft, S3-172491, Oct. 6, 2017, XP051348360, 4 pages.
PIDS: "SG report to be checked for LI," ETSI Draft; LI (17) R41001R1, 3GPP TR 33.899, V1.3.0, Aug. 30, 2017, pp. 1-605, XP014298841.
3GPP TS 23.501 V1.5.0, "3rd Generation Partnership Project; Technical Specification Group Services and System Aspects; System Architecture for the 5G System; Stage 2 (Release 15)," Nov. 2017, 170 pages.
3GPP TS 23.502, V1.3.0, "3rd Generation Partnership Project; Technical Specification Group Services and System Aspects; Procedures for the 5G System; Stage 2 (Release 15)," Nov. 2017, 215 pages.
3GPP TS 38.331, V0.1.0, "3rd Generation Partnership Project; Technical Specification Group Radio Access Network; NR; Radio Resource Control (RRC); Protocol specification (Release 15)," Oct. 2017, 42 pages.

\* cited by examiner

SECURITY PROTECTION METHOD AND APPARATUS

CROSS-REFERENCE TO RELATED APPLICATIONS

This application is a continuation of U.S. patent application Ser. No. 16/404,163, filed on May 6, 2019, which is a continuation of International Patent Application No. PCT/CN2018/112897, filed on Oct. 31, 2018, which claims priority to Chinese Patent Application No. 201711148926.5, filed on Nov. 17, 2017. The disclosures of the aforementioned applications are hereby incorporated by reference in their entireties.

TECHNICAL FIELD

Embodiments of this application relate to the field of wireless communications technologies, and in particular, to a security protection method and an apparatus.

BACKGROUND

In a 5th Generation (5G) system, a terminal may access an Access and Mobility Management Function (AMF) node via only a 3rd Generation Partnership Project (3GPP) access technology, or via only a non-3GPP (non-3GPP) access technology, or via both a 3GPP access technology and a non-3GPP access technology. When the terminal accesses the AMF node via both the 3GPP access technology and the non-3GPP access technology, there are two non-access stratum (NAS) connection links between the terminal and the AMF node at the same time. If the terminal uses one set of NAS keys and one set of NAS COUNTs to separately protect the two connection links, the following case may occur: the AMF node first receives a relatively small NAS COUNT transmitted through one link, and then receives a relatively large NAS COUNT transmitted through the other link. Consequently, a replay attack occurs, resulting in a problem of relatively poor data security of NAS connection link transmission between the terminal and the AMF node. Therefore, when a plurality of NAS connection links exist between the terminal and the AMF node, how to perform security protection on the plurality of NAS connection links is an urgent problem to be resolved.

SUMMARY

Embodiments of this application provide a security protection method and an apparatus, to implement security protection for a plurality of NAS connection links.

To achieve the foregoing objectives, the following technical solutions are provided in the embodiments of this application.

An embodiment of this application provides a security protection method. The method includes determining, by a terminal, a first parameter, and then performing security protection on a NAS message based on the first parameter, a NAS key, and a NAS COUNT corresponding to an access technology used to transmit the NAS message. The first parameter is an input parameter used when the terminal performs security protection on the NAS message, and is used to indicate the access technology used to transmit the NAS message. The terminal can support at least two access technologies, and can separately maintain a corresponding NAS COUNT for each of the at least two access technologies.

For example, the at least two access technologies supported by the terminal may include a 3GPP access technology and a different access technology that can share the same 3GPP network core network device with the 3GPP access technology. The different access technology could be, for example, a non-3GPP access technology or a fixed network access technology.

Optionally, the first parameter may be further used to indicate a transmission path used by the terminal to transmit the NAS message, and the terminal can separately maintain a corresponding NAS COUNT for each transmission path used to transmit NAS messages.

The first parameter may be an input parameter newly added in an encryption/decryption process or an integrity protection process, for example, an ACCESS parameter. A bit of the ACCESS parameter may be set to different values to represent different access technologies. For example, if the first parameter is 00, it indicates that the 3GPP access technology is used. As another example, if the first parameter is 01, it indicates that the non-3GPP access technology is used. Alternatively, the first parameter may be all or some bits of the existing input parameter COUNT in an encryption/decryption process or an integrity protection process, or the first parameter may be all or some bits of the existing input parameter BEARER in an encryption/decryption process or an integrity protection process.

The NAS key is common to the at least two access technologies supported by the terminal.

According to this method, the terminal can separately maintain the corresponding NAS COUNTs for each of the at least two access technologies. The terminal does not use the same set of NAS COUNTs when transmitting NAS messages via different access technologies. Instead, the terminal performs security protection on the NAS message using a NAS COUNT maintained for a corresponding access technology. This can avoid a replay attack problem that occurs when a core network device first receives a relatively small NAS COUNT transmitted using one link, and then receives a relatively large NAS COUNT transmitted using another link. In addition, in this application, the first parameter used to differentiate different access technologies is further used when security protection is performed on the NAS message. Therefore, even if a same NAS key and a same NAS COUNT are used when security protection is performed on a NAS message transmitted via the different access technologies, security protection results of the NAS message are different, reducing a possibility of occurrence of a replay attack, thereby implementing security protection for a plurality of NAS connection links.

In a possible design, the at least two access technologies include a first access technology. If the access technology used to transmit the NAS message is the first access technology, before the terminal determines the first parameter, the terminal may determine a first uplink NAS COUNT corresponding to the first access technology, and then the terminal sends a first message to the core network device, where security protection is performed on the first message using the first uplink NAS COUNT and the NAS key, and the first message carries some or all bits of the first uplink NAS COUNT.

For example, the first access technology may be a non-3GPP access technology.

In a possible implementation, the start value of the first uplink NAS COUNT is 0, wherein some or all bits of the first uplink NAS COUNT is 0. Alternatively, the first uplink NAS COUNT is a random number. In some embodiments, some or all bits in the first uplink NAS COUNT are random numbers. For example, a Sequence Number part or a NAS overflow part of the first uplink NAS COUNT is a random number. In this case, a remaining part is 0. Alternatively, the at least two access technologies further include a second access technology, and the first uplink NAS COUNT is an uplink NAS COUNT that corresponds to the second access technology and that is stored by the terminal. If the terminal stores at least two uplink NAS COUNTs corresponding to the second access technology, the first uplink NAS COUNT is a largest uplink NAS COUNT that corresponds to the second access technology and that is stored by the terminal. Alternatively, the at least two access technologies further include a second access technology, and the first uplink NAS COUNT is a sum of 1 and an uplink NAS COUNT that corresponds to the second access technology and that is stored by the terminal. If the terminal stores at least two uplink NAS COUNTs corresponding to the second access technology, the first uplink NAS COUNT is a sum of 1 and a largest uplink NAS COUNT that corresponds to the second access technology and that is stored by the terminal. Alternatively, the first uplink NAS COUNT is an uplink NAS COUNT that corresponds to the first access technology and that is stored by the terminal. If the terminal stores at least two uplink NAS COUNTs corresponding to the first access technology, the first uplink NAS COUNT is a largest uplink NAS COUNT that corresponds to the first access technology and that is stored by the terminal. Alternatively, the first uplink NAS COUNT is a sum of 1 and an uplink NAS COUNT that corresponds to the first access technology and that is stored by the terminal. If the terminal stores at least two uplink NAS COUNTs corresponding to the first access technology, the first uplink NAS COUNT is a sum of 1 and a largest uplink NAS COUNT that corresponds to the first access technology and that is stored by the terminal.

In another possible design, the at least two access technologies include a first access technology and a second access technology. If the access technology used to transmit the NAS message is the first access technology, before the terminal determines the first parameter, the terminal may send a first message to the core network device, where security protection is performed on the first message using the NAS key and an uplink NAS COUNT corresponding to the second access technology, and the first message carries some or all bits of the uplink NAS COUNT corresponding to the second access technology.

The second access technology is a 3GPP access technology. Optionally, a premise for implementing this design is that the terminal has accessed the core network device via the 3GPP access technology.

In a possible design, the first message may carry first indication information, and the first indication information is used to indicate an access technology corresponding to some or all bits of the uplink NAS COUNT carried in the first message. Optionally, the first indication information may be further used to indicate a transmission path corresponding to some or all bits of the uplink NAS COUNT carried in the first message.

In a possible design, the terminal receives a second message from the core network device, where the second message includes one or both of a second uplink NAS COUNT and a first downlink NAS COUNT that are corresponding to the first access technology.

Optionally, the second message may include the first downlink NAS COUNT corresponding to the first access technology. Alternatively, the second message includes both the second uplink NAS COUNT and the first downlink NAS COUNT that are corresponding to the first access technology.

Optionally, the second uplink NAS COUNT and the first downlink NAS COUNT that are corresponding to the first access technology are the same.

In a possible implementation, the start value of the second uplink NAS COUNT is 0, wherein all or some bits of the second uplink NAS COUNT are 0. Alternatively, the second uplink NAS COUNT is a random number. In some embodiments, some or all bits in the second uplink NAS COUNT are random numbers. For example, a Sequence Number part or a NAS overflow part of the second uplink NAS COUNT is a random number. In this case, a remaining part is 0. Alternatively, the second uplink NAS COUNT is a downlink NAS COUNT that corresponds to the second access technology and that is stored by the core network device. If the core network device stores at least two downlink NAS COUNTs corresponding to the second access technology, the second uplink NAS COUNT is a largest downlink NAS COUNT that corresponds to the second access technology and that is stored by the core network device. Alternatively, the second uplink NAS COUNT is a sum of 1 and a downlink NAS COUNT that corresponds to the second access technology and that is stored by the core network device. If the core network device stores at least two downlink NAS COUNTs corresponding to the second access technology, the second uplink NAS COUNT is a sum of 1 and a largest downlink NAS COUNT that corresponds to the second access technology and that is stored by the core network device. Alternatively, the second uplink NAS COUNT is a sum of 1 and a downlink NAS COUNT that corresponds to the first access technology and that is stored by the core network device. If the core network device stores at least two downlink NAS COUNTs corresponding to the first access technology, the second uplink NAS COUNT is a sum of 1 and a largest downlink NAS COUNT that corresponds to the first access technology and that is stored by the core network device. Alternatively, the second uplink NAS COUNT is the first uplink NAS COUNT; or the second uplink NAS COUNT is a sum of 1 and the first uplink NAS COUNT.

In a possible design, the start value of the first downlink NAS COUNT is 0, wherein all or some bits of the first downlink NAS COUNT are 0. Alternatively, the first downlink NAS COUNT is a random number. In some embodiments, some or all bits in the first downlink NAS COUNT are random numbers. For example, a Sequence Number part or a NAS overflow part of the first downlink NAS COUNT is a random number. In this case, a remaining part is 0. Alternatively, the first downlink NAS COUNT is a downlink NAS COUNT that corresponds to the second access technology and that is stored by the core network device. If the core network device stores at least two downlink NAS COUNTs corresponding to the second access technology, the first downlink NAS COUNT is a largest downlink NAS COUNT that corresponds to the second access technology and that is stored by the core network device. Alternatively, the first downlink NAS COUNT is a sum of 1 and a downlink NAS COUNT that corresponds to the second access technology and that is stored by the core network device. If the core network device stores at least two downlink NAS COUNTs corresponding to the second access technology, the first downlink NAS COUNT is a sum of 1 and a largest downlink NAS COUNT that corresponds to the second access technology and that is stored by the core network device. Alternatively, the first downlink NAS COUNT is a sum of 1 and a downlink NAS COUNT that corresponds to the first access technology and that is stored by the core network device. If the core network device stores at least two downlink NAS COUNTs corresponding to the first access technology, the first downlink NAS COUNT is a sum of 1 and a largest downlink NAS COUNT that corresponds to the first access technology and that is stored by the core network device.

In a possible design, the second message carries second indication information, and the second indication information is used to indicate an access technology corresponding to the first downlink NAS COUNT carried in the second message. Optionally, the second message may further carry indication information used to indicate the second uplink NAS COUNT carried in the second message.

Optionally, the second indication information is used to indicate a transmission path corresponding to the first downlink NAS COUNT carried in the second message. Optionally, the second message may further carry indication information that is used to indicate a transmission path corresponding to the second uplink NAS COUNT carried in the second message.

According to a second aspect, an embodiment of this application provides a security protection method. The method includes determining, by a core network device, a first parameter, and then performing, by the core network device, security protection on a NAS message based on the first parameter, a NAS key, and a NAS COUNT corresponding to an access technology used to transmit the NAS message. The first parameter is used to indicate an access technology used to transmit the NAS message. The core network device can separately maintain a corresponding NAS COUNT for each of at least two access technologies supported by a terminal.

For example, the at least two access technologies supported by the terminal may include a 3GPP access technology and a different access technology. The different access technology could be, for example, a non-3GPP access technology or a fixed network access technology.

Optionally, the first parameter may be further used to indicate a transmission path used by the core network device to transmit the NAS message, and the core network device can separately maintain a corresponding NAS COUNT for each transmission path used to transmit NAS messages.

The first parameter may be an input parameter newly added in an encryption/decryption process or an integrity protection process, for example, an ACCESS parameter. A bit of the ACCESS parameter may be set to different values to represent different access technologies. For example, if the first parameter is 00, the 3GPP access technology is used; or if the first parameter is 01, the non-3GPP access technology is used. Alternatively, the first parameter may further be all or some bits of the existing input parameter COUNT in an encryption/decryption process or an integrity protection process. Alternatively, the first parameter may be all or some bits of the existing input parameter BEARER in an encryption/decryption process or an integrity protection process.

The NAS key is common to the at least two access technologies supported by the terminal.

According to this method, the core network device can separately maintain the corresponding NAS COUNTS for each of the at least two access technologies. The terminal does not use one set of NAS COUNTs when transmitting the NAS message using different access technologies. Instead, the core network device performs security protection on the NAS message using a NAS COUNT maintained for a corresponding access technology. This can avoid a replay attack problem that occurs when a terminal first receives a relatively small NAS COUNT transmitted using one link, and then receives a relatively large NAS COUNT transmitted using another link. In addition, in this application, the first parameter used to differentiate different access technologies is further used when security protection is performed on the NAS message. Therefore, even if a same NAS key and a same NAS COUNT are used when security protection is performed on a NAS message transmitted via the different access technologies, security protection results of the NAS message are different, reducing a possibility of occurrence of a replay attack, thereby implementing security protection for a plurality of NAS connection links.

In a possible design, the at least two access technologies include a first access technology. If the access technology used to transmit the NAS message is the first access technology, before the core network device determines the first parameter, the core network device may receive a first message, where security protection is performed on the first message using the NAS key and a first uplink NAS COUNT corresponding to the first access technology, and the first message carries a first uplink NAS COUNT.

For example, the first access technology may be a non-3GPP access technology.

In a possible implementation, the start value of the first uplink NAS COUNT is 0, wherein a bit, some bits, or all bits of the first uplink NAS COUNT is 0. Alternatively, the first uplink NAS COUNT is a random number. In some embodiments, some or all bits in the first uplink NAS COUNT are random numbers. For example, a Sequence Number part or a NAS overflow part of the first uplink NAS COUNT is a random number. In this case, a remaining part is 0. Alternatively, the at least two access technologies further include a second access technology, and the first uplink NAS COUNT is an uplink NAS COUNT that corresponds to the second access technology and that is stored by the terminal. If the terminal stores at least two uplink NAS COUNTs corresponding to the second access technology, the first uplink NAS COUNT is a largest uplink NAS COUNT that corresponds to the second access technology and that is stored by the terminal. Alternatively, the at least two access technologies further include a second access technology, and the first uplink NAS COUNT is a sum of 1 and an uplink NAS COUNT that corresponds to the second access technology and that is stored by the terminal. If the terminal stores at least two uplink NAS COUNTs corresponding to the second access technology, the first uplink NAS COUNT is a sum of 1 and a largest uplink NAS COUNT that corresponds to the second access technology and that is stored by the terminal. Alternatively, the first uplink NAS COUNT is an uplink NAS COUNT that corresponds to the first access technology and that is stored by the terminal. If the terminal stores at least two uplink NAS COUNTs corresponding to the first access technology, the first uplink NAS COUNT is a largest uplink NAS COUNT that corresponds to the first access technology and that is stored by the terminal. Alternatively, the first uplink NAS COUNT is a sum of 1 and an uplink NAS COUNT that corresponds to the first access technology and that is stored by the terminal. If the terminal stores at least two uplink NAS COUNTs corresponding to the first access technology, the first uplink NAS COUNT is a sum of 1 and a largest uplink NAS COUNT that corresponds to the first access technology and that is stored by the terminal.

In another possible design, the at least two access technologies include a first access technology and a second access technology. If the access technology used to transmit the NAS message is the first access technology, before the core network device determines the first parameter, the core network device may receive a first message, where security protection is performed on the first message using the NAS key and an uplink NAS COUNT corresponding to the second access technology, and the first message carries a bit, some bits, or all bits of the uplink NAS COUNT corresponding to the second access technology.

The second access technology is a 3GPP access technology. Optionally, a premise for implementing this design is that the terminal has accessed the core network device using the 3GPP access technology.

In a possible design, the first message carries first indication information, and the first indication information is used to indicate an access technology corresponding to a bit, some bits, or all bits of the uplink NAS COUNT carried in the first message. Optionally, the first indication information may be further used to indicate a transmission path corresponding to a bit, some bits, or all bits of the uplink NAS COUNT carried in the first message.

In a possible design, after the core network device receives the first message from the terminal, the core network device verifies, according to the uplink NAS COUNT corresponding to the access technology indicated by the first indication information, a bit, some bits, or all bits of the NAS COUNT carried in the first message.

In this embodiment of this application, the core network device may independently maintain a NAS COUNT of the 3GPP access technology and a NAS COUNT of the non-3GPP access technology, and further verify the received uplink NAS COUNT according to an uplink NAS COUNT maintained by the core network device, thereby reducing a possibility of occurrence of a replay attack.

In a possible design, the core network device determines one or both of a second uplink NAS COUNT and a first downlink NAS COUNT that are corresponding to the first access technology, and then the core network device sends a second message to the terminal, where the second message includes one or both of the second uplink NAS COUNT and the first downlink NAS COUNT that are corresponding to the first access technology.

Optionally, the second message may include the first downlink NAS COUNT corresponding to the first access technology. Alternatively, the second message includes both the second uplink NAS COUNT and the first downlink NAS COUNT that are corresponding to the first access technology.

Optionally, the second uplink NAS COUNT and the first downlink NAS COUNT that are corresponding to the first access technology are the same.

In a possible implementation, the start value of the second uplink NAS COUNT is 0, wherein all or some bits of the second uplink NAS COUNT are 0. Alternatively, the second uplink NAS COUNT is a random number. In some embodiments, some or all bits in the second uplink NAS COUNT are random numbers. For example, a Sequence Number part or a NAS overflow part of the second uplink NAS COUNT is a random number. In this case, a remaining part is 0. Alternatively, the second uplink NAS COUNT is a downlink NAS COUNT that corresponds to the second access technology and that is stored by the core network device. If the core network device stores at least two downlink NAS COUNTs corresponding to the second access technology, the second uplink NAS COUNT is a largest downlink NAS COUNT that corresponds to the second access technology and that is stored by the core network device. Alternatively, the second uplink NAS COUNT is a sum of 1 and a downlink NAS COUNT that corresponds to the second access technology and that is stored by the core network device. If the core network device stores at least two downlink NAS COUNTs corresponding to the second access technology, the second uplink NAS COUNT is a sum of 1 and a largest downlink NAS COUNT that corresponds to the second access technology and that is stored by the core network device. Alternatively, the second uplink NAS COUNT is a sum of 1 and a downlink NAS COUNT that corresponds to the first access technology and that is stored by the core network device. If the core network device stores at least two downlink NAS COUNTs corresponding to the first access technology, the second uplink NAS COUNT is a sum of 1 and a largest downlink NAS COUNT that corresponds to the first access technology and that is stored by the core network device. Alternatively, the second uplink NAS COUNT is the first uplink NAS COUNT, or the second uplink NAS COUNT is a sum of 1 and the first uplink NAS COUNT.

In a possible implementation, the start value of the first downlink NAS COUNT is 0, wherein all or some bits of the first downlink NAS COUNT are 0. Alternatively, the first downlink NAS COUNT is a random number. In some embodiments, some or all bits in the first downlink NAS COUNT are random numbers. For example, a Sequence Number part or a NAS overflow part of the first downlink NAS COUNT is a random number. In this case, a remaining part is 0. Alternatively, the first downlink NAS COUNT is a downlink NAS COUNT that corresponds to the second access technology and that is stored by the core network device. If the core network device stores at least two downlink NAS COUNTs corresponding to the second access technology, the first downlink NAS COUNT is a largest downlink NAS COUNT that corresponds to the second access technology and that is stored by the core network device. Alternatively, the first downlink NAS COUNT is a sum of 1 and a downlink NAS COUNT that corresponds to the second access technology and that is stored by the core network device. If the core network device stores at least two downlink NAS COUNTs corresponding to the second access technology, the first downlink NAS COUNT is a sum of 1 and a largest downlink NAS COUNT that corresponds to the second access technology and that is stored by the core network device. Alternatively, the first downlink NAS COUNT is a sum of 1 and a downlink NAS COUNT that corresponds to the first access technology and that is stored by the core network device. If the core network device stores at least two downlink NAS COUNTs corresponding to the first access technology, the first downlink NAS COUNT is a sum of 1 and a largest downlink NAS COUNT that corresponds to the first access technology and that is stored by the core network device.

In a possible design, the second message carries second indication information, and the second indication information is used to indicate an access technology corresponding to the first downlink NAS COUNT carried in the second message. Optionally, the second message may further carry indication information used to indicate the second uplink NAS COUNT carried in the second message.

Optionally, the second indication information is used to indicate a transmission path corresponding to the first downlink NAS COUNT carried in the second message. Optionally, the second message may further carry indication information that is used to indicate a transmission path corresponding to the second uplink NAS COUNT carried in the second message.

According to a third aspect, an embodiment of this application provides an apparatus, and the apparatus has a function of implementing actions of a terminal in the foregoing method design. The function may be implemented by hardware, or may be implemented by hardware executing corresponding software. The hardware or software includes one or more modules corresponding to the foregoing function. For example, the apparatus may be a terminal, or may be a chip in a terminal.

In a possible design, the apparatus is a terminal, and the terminal includes a processor. The processor is configured to support the terminal in performing the corresponding function in the foregoing method. Further, the terminal may further include a transmitter and a receiver, where the transmitter and the receiver are configured to support communication between the terminal and a core network device. Further, the terminal may further include a memory, and the memory is configured to couple to the processor, and store a program instruction and data that are necessary to the terminal.

According to a fourth aspect, an embodiment of this application provides an apparatus, and the apparatus has a function of implementing actions of a core network device in the foregoing method design. The function may be implemented by hardware, or may be implemented by hardware executing corresponding software. The hardware or software includes one or more modules corresponding to the foregoing function. For example, the apparatus may be a core network device, or may be a chip in a core network device.

In a possible design, the apparatus is a core network device, and the core network device includes a processor. The processor is configured to support the core network device in performing a corresponding function in the foregoing method. Further, the core network device may further include a transmitter and a receiver, where the transmitter and the receiver are configured to support communication between the core network device and a terminal. Further, the core network device may further include a memory, and the memory is configured to couple to the processor, and store a program instruction and data that are necessary to the terminal.

According to a fifth aspect, an embodiment of this application provides a communications system, where the system includes the terminal and the core network device described in the foregoing aspects. Optionally, the system may further include a base station, an N3IWF node, and the terminal and the core network device described in the foregoing aspects.

According to a sixth aspect, an embodiment of this application provides a computer storage medium, configured to store a computer software instruction used by the foregoing terminal, where the computer software instruction includes a program designed to execute the first aspect.

According to a seventh aspect, an embodiment of this application provides a computer storage medium configured to store a computer software instruction used by the foregoing core network device. The computer software instruction includes a program designed to execute the second aspect.

According to an eighth aspect, an embodiment of this application provides a computer program product including an instruction. When a computer runs the instruction, the computer is enabled to perform the method in the first aspect.

According to a ninth aspect, an embodiment of this application provides a computer program product including an instruction. When a computer runs the instruction, the computer is enabled to perform the method in the second aspect.

According to a tenth aspect, an embodiment of this application provides a chip system applied to a terminal, where the chip system includes at least one processor, at least one memory, and at least one transceiver circuit. The at least one memory, the at least one transceiver circuit, and the at least one processor are connected to each other through lines. The at least one memory stores an instruction. The instruction is executed by the at least one processor, to execute operations of the terminal in the method described in the first aspect.

According to an eleventh aspect, an embodiment of this application provides a chip system applied to a core network device, where the chip system includes at least one processor, at least one memory, and at least one transceiver circuit. The at least one memory, the at least one transceiver circuit, and the at least one processor are connected to each other through lines. The at least one memory stores an instruction. The instruction is executed by the at least one processor, to execute operations of the core network device in the method described in the second aspect.

According to the security protection method provided in the embodiments of this application, the terminal can separately maintain the corresponding NAS COUNT for each of the at least two access technologies. The terminal does not use one set of NAS COUNTS when transmitting the NAS message via different access technologies. Instead, the terminal performs security protection on the NAS message using a NAS COUNT maintained for a corresponding access technology. This can avoid a replay attack problem that occurs when the core network device first receives a relatively small NAS COUNT transmitted using one link, and then receives a relatively large NAS COUNT transmitted via another link. In addition, in this application, the first parameter used to differentiate different access technologies is further used when security protection is performed on the NAS message. Therefore, even if a same NAS key and a same NAS COUNT are used when security protection is performed on a NAS message transmitted via the different access technologies, security protection results of the NAS message are different, reducing a possibility of occurrence of a replay attack, thereby implementing security protection for a plurality of NAS connection links.

DESCRIPTION OF EMBODIMENTS

The following further describes this application in detail with reference to accompanying drawings. An operation method in method embodiments may also be applied to an apparatus embodiment or a system embodiment. In descriptions of this application, unless otherwise specified, "a plurality of" means two or more than two.

A system architecture and a service scenario described in this application are intended to more clearly describe the technical solutions in this application, but are not intended to limit the technical solutions provided in this application. A person of ordinary skill in the art may know that as the system architecture evolves and a new service scenario emerges, the technical solutions provided in this application are also applicable to a similar technical problem.

It should be noted that, in this application, a term such as "example" or "for example" is used as an example to represent giving an illustration, or a description. Any embodiment or design solution described as an "example" or "for example" in this application should not be explained as being more preferred or having more advantages than another embodiment or design solution. That is, use of the word "example", or "for example", or the like is intended to present a related concept in a certain manner.

Figure 1:
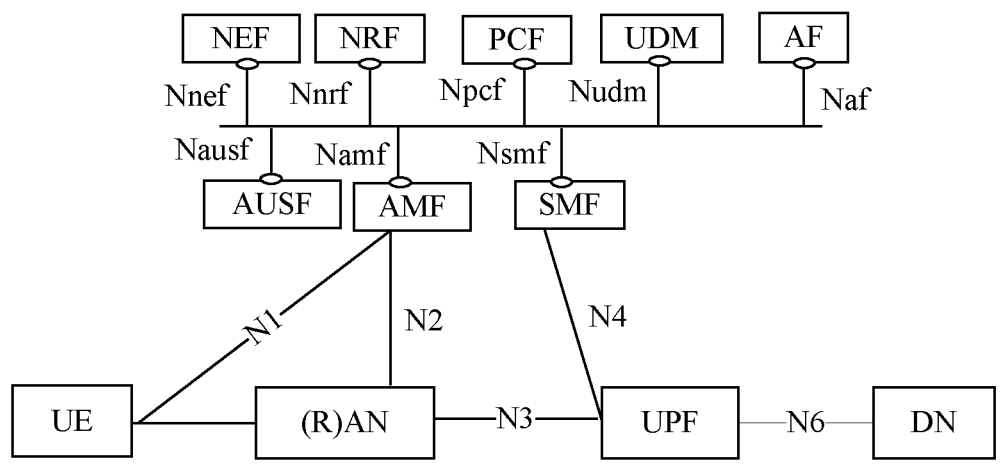
FIG. 1 is a schematic diagram of a possible network architecture according to an embodiment of this application.

Embodiments of this application may be applied to a next-generation wireless communications system, for example, a 5G communications system. FIG. 1 shows a schematic diagram of a possible network architecture according to this application. The network architecture includes the following.

An AMF node is a network element responsible for mobility management, and may be configured to implement a function other than session management in mobility management entity (MME) functions, for example, a function such as lawful interception or access authorization.

A Session Management Function (SMF) node is configured to allocate a session resource to a user plane.

An Authentication Server Function (AUSF) node is responsible for performing authentication on a terminal, such as verifying and transferring a to-be-authenticated parameter, and authenticating authenticity of the terminal. Main functions include: receiving an authentication request sent by a Security Anchor Function (SEAF) node, and selecting an authentication method. When an Extensible Authentication Protocol Method for 3rd Generation Authentication and Key Agreement (EAP-AKA') authentication method is used, the AUSF node may complete authentication from a network side to the terminal.

An SEAF node may be a part of the AMF node, or may be an independent network element, and is mainly responsible for initiating an authentication request to the AUSF node and completing authentication from the network side to the terminal in an authentication process of Evolved Packet System Authentication and Key Agreement (EPS-AKA*).

A User Plane Function (UPF) node is an egress of user plane data, and is configured to connect to an external network.

A data network (DN) is a network used to provide external data, for example, the Internet.

A (radio) access network ((R)AN) node may use different access technologies. Currently, there are two types of radio access technologies: a 3GPP access technology (for example, a radio access technology used in a 3G, 4G, or 5G system) and a non-3GPP access technology. The 3GPP access technology is an access technology that complies with a 3GPP standard specification. An access network using the 3GPP access technology is a radio access network (RAN). An access network device in the 5G system is referred to as a next generation base station or next generation nodeB (gNB). The non-3GPP access technology is an access technology that does not comply with the 3GPP standard specification, for example, a radio technology represented by a Wi-Fi access point (AP).

A terminal in this application is a device that has wireless transmission and reception functions. The terminal may be deployed on land, for example, an indoor device, an outdoor device, a handheld device, or an in-vehicle device. Alternatively, the terminal may be deployed on the water (for example, on a ship), or may be deployed in the air (for example, on a plane, a balloon, or a satellite). The terminal may include various types of user equipment (UE), mobile phones, tablet computers, computers with wireless transmission and reception functions, wireless data cards, virtual reality (VR) terminal devices, augmented reality (AR) terminal devices, machine type communication (MTC) terminal devices, terminal devices in industrial control, self-driving terminal devices, remote medical terminal devices, smart grid terminal devices, terminal devices in transportation safety, terminal devices in a smart city, wearable devices (such as a smartwatch, a smart band, and a pedometer), or the like. Terminals having similar wireless communication functions may have different names in systems in which different radio access technologies are used. For ease of description, in the embodiments of this application, the foregoing apparatuses with wireless transmission and reception communication functions are collectively referred to as terminals.

In some embodiments, the terminal in this application stores a long-term key and a related function. When performing two-way authentication with a core network node (such as an AMF node, an AUSF node, and an SEAF node), the terminal may verify authenticity of a network using the long-term key and the related function.

An access network device in the embodiments of this application is an apparatus that provides a wireless communication function for a terminal. For example, the access network device may be a base station (BS), and the base station may include various forms of macro base stations, micro base stations, relay stations, access points, or the like. Devices having functions of a base station may have different names in systems in which different radio access technologies are used. For example, in the 5G system, a device having the functions of the base station is referred to as a next generation node base station, and may be represented as a gNB. In a Long Term Evolution (LTE) system, a device having the functions of the base station is referred to as an evolved NodeB (eNB or eNodeB). In a 3rd Generation (3G) communications system, a device having the functions of the base station is referred to as a NodeB (Node B). For ease of description, in the embodiments of the present disclosure, the foregoing apparatuses that provide the wireless communication function for the terminal are collectively referred to as access network devices.

A Network Exposure Function (NEF) node is mainly configured to interact with a third party, such that the third party can indirectly interact with a network element in some 3GPP networks.

A Network Repository Function (NRF) node is configured for inter-network element discovery and network function (NF) maintenance.

A Policy Control Function (PCF) node stores a latest quality of service (QoS) rule. A base station may allocate an appropriate resource to a user plane transmission channel according to a QoS rule provided by an SMF node.

A Unified Data Management (UDM) node is configured to store subscription information of a user.

An Application Function (AF) node may be located inside the DN, and is a functional network element deployed in the third party. This network element is mainly configured to notify the PCF node of a latest service requirement of a third-party enterprise for an application. The PCF node may generate a corresponding QoS rule based on the service requirement, to ensure that a service provided by a network meets the requirement specified by the third party.

Figure 2:
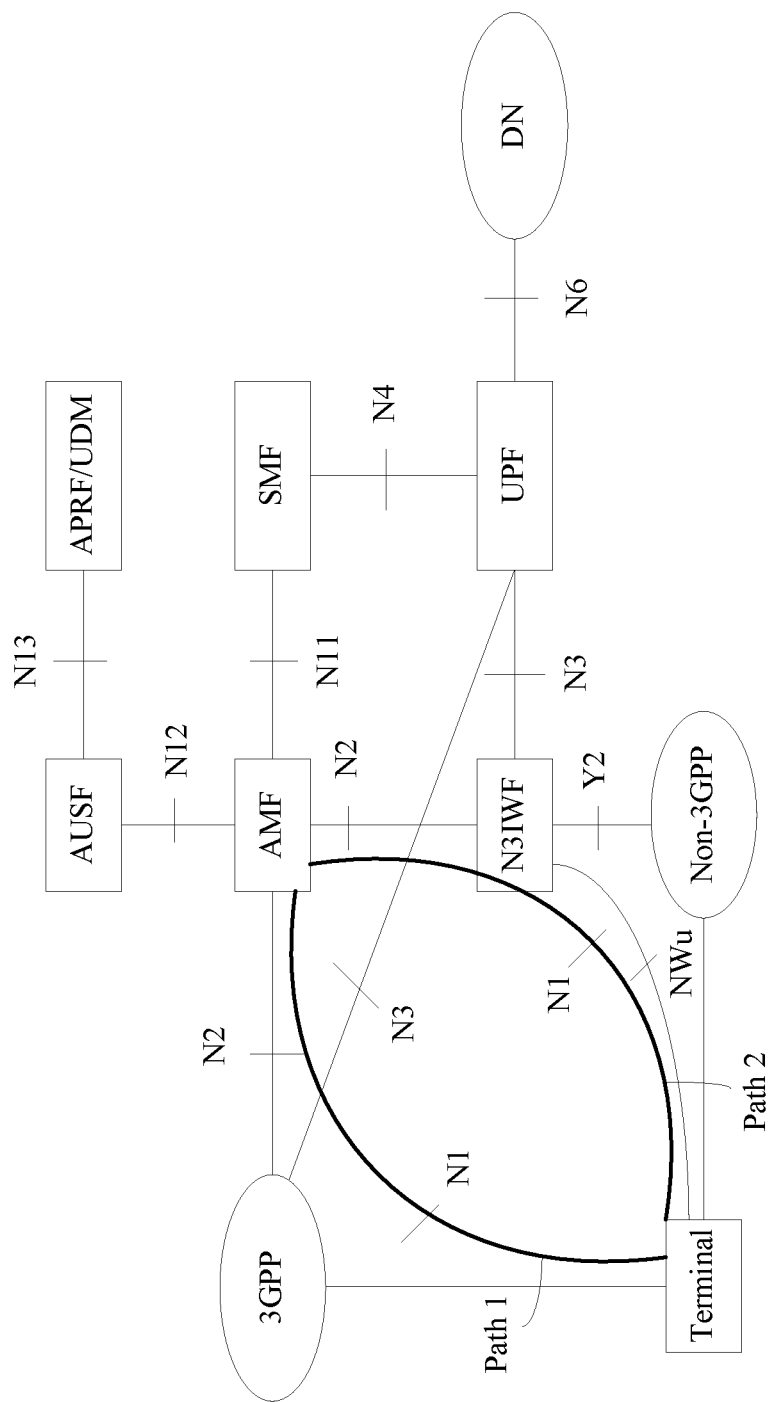
FIG. 2 is a schematic diagram of another possible network architecture according to an embodiment of this application.

In the embodiments of this application, the terminal may access the AMF node using at least two access technologies. That the at least two access technologies include the 3GPP access technology and the non-3GPP access technology is used as an example. An embodiment of this application further provides a schematic diagram of a possible network architecture. As shown in FIG. 2, the network architecture includes an AMF node, an AUSF node, an SMF node, a UPF node, a UDM node (or an Authentication Credential Repository and Processing Function (APRF) node), a terminal, and a non-3GPP Interworking Function (N3IWF) node.

For the AMF node, the AUSF node, the SMF node, the UPF node, the UDM node, and the terminal, refer to the description in FIG. 1. Details are not described herein again.

The N3IWF node is configured to support the terminal in accessing the AMF node using the non-3GPP access technology.

With reference to the network architecture shown in FIG. 2, the terminal may access the AMF node via both the 3GPP access technology and the non-3GPP access technology. The 3GPP access technology may be simply represented as 3GPP, and the non-3GPP access technology may be simply represented as non-3GPP. A path 1 in FIG. 2 is a path over which the terminal accesses the AMF node via the 3GPP, and a path 2 is a path over which the terminal accesses the AMF node via the non-3GPP, in other words, the terminal may access the AMF node via the N3IWF node. When the terminal accesses the AMF node via both the 3GPP and non-3GPP, if the terminal needs to send a NAS message to the AMF node, in a possible implementation, the NAS message may be split into at least two message blocks, where one or more of the message blocks are transmitted via the 3GPP, and one or more of the message blocks are transmitted via the non-3GPP. For example, the NAS message may be divided into a message block 1, a message block 2, a message block 3, a message block 4, and a message block 5. The message blocks 2 and 4 are transmitted via the 3GPP, and the message blocks 1, 3, and 5 are transmitted via the non-3GPP. In another possible implementation, the terminal may transmit an entire NAS message via the 3GPP, and transmit another entire NAS message via the non-3GPP.

First, terms related to the embodiments of this application are explained.

(1) NAS COUNT

A NAS COUNT includes 24 bits including a 16-bit NAS overflow and an 8-bit Sequence Number.

A start value of the NAS COUNT is 0. An uplink NAS COUNT is increased by 1 each time the terminal sends one NAS message to the core network device, and a downlink NAS COUNT is increased by 1 each time the core network device sends one NAS message to the terminal. After an authentication process from the terminal to the core network device is completed, both the uplink NAS COUNT and the downlink NAS COUNT are set to 0.

Optionally, there are two methods for maintaining the NAS COUNT, as follows.

Method 1: After a NAS message is sent, a stored NAS COUNT is increased by 1 and is stored. When a NAS message needs to be sent a subsequent time, security protection is performed on the NAS message using the stored NAS COUNT.

Method 2: After a NAS message is sent, when a NAS message needs to be sent a subsequent time, a stored NAS COUNT is increased by 1 to obtain a new NAS COUNT, and security protection is performed on the NAS message using the new NAS COUNT.

After receiving the NAS message, the terminal and the core network device may verify whether a received NAS COUNT is reused, to be more specific, verify whether the NAS COUNT carried in the NAS message is greater than a previously received NAS COUNT. For example, if the AMF node receives an uplink NAS COUNT from the terminal, the received uplink NAS COUNT may be compared with a previously received uplink NAS COUNT. If the received uplink NAS COUNT is greater than the previously received uplink NAS COUNT, security verification performed on the NAS message succeeds.

When encryption and decryption, and integrity protection are performed using the NAS COUNT, the NAS COUNT is padded to 32 bits. In other words, 8 bits are padded in front of an original 24-bit NAS COUNT, where the padded 8 bits may be all 0.

(2) Encryption and Decryption

Figure 3:
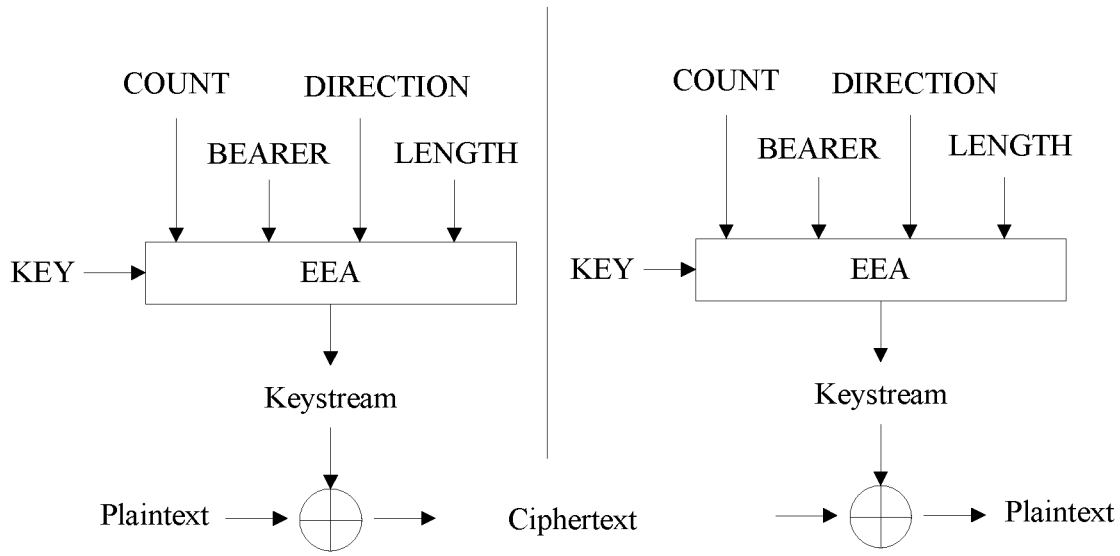
FIG. 3 is an example of a schematic diagram of an encryption and decryption method according to an embodiment of this application.

FIG. 3 shows a process of encrypting and decrypting a NAS message.

Herein, the key may be a NAS key.

A COUNT used for encryption and decryption includes 32 bits, where the first 8 bits are 0, the middle 16 bits are a NAS overflow, and the last 8 bits are a Sequence Number.

Bearer information (BEARER) includes 5 bits, and the 5 bits are all 0.

A data transmission direction (DIRECTION) is used to indicate uplink or downlink. When encryption and decryption are performed on an uplink NAS message, the DIRECTION indicates uplink. When encryption and decryption are performed on a downlink NAS message, the DIRECTION indicates downlink.

A length (LENGTH) is used to indicate a data length of a NAS message that needs to be encrypted or decrypted.

An evolved packet system (EPS) encryption algorithm (EEA) is an algorithm used to encrypt and decrypt a NAS message.

An encryption process is as follows: performing EEA processing on input parameters (the KEY, the COUNT, the BEARER, the DIRECTION, and the LENGTH), to obtain a keystream); and performing addition modulo 2 on the keystream and a plaintext (a NAS message), to obtain a ciphertext. A decryption process is as follows: performing EEA processing on the foregoing input parameters, to obtain the keystream; and performing addition modulo 2 on the keystream and the ciphertext, to recover the plaintext.

(3) Integrity Protection

Figure 4:
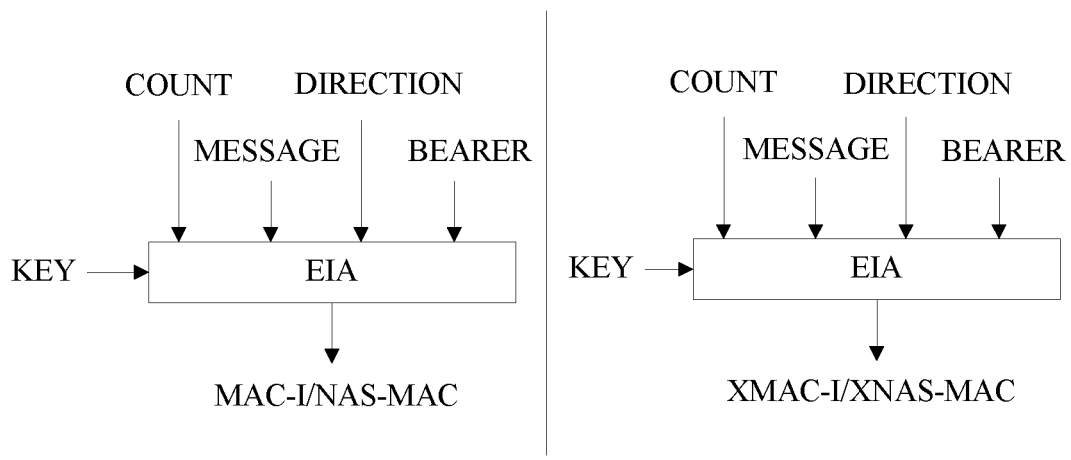
FIG. 4 is an example of a schematic diagram of an integrity protection method according to an embodiment of this application.

FIG. 4 shows a process of performing integrity protection and integrity protection verification on a NAS message.

A message (MESSAGE) is a message on which integrity protection needs to be performed, and may be a NAS message.

An EPS integrity algorithm (EIA) is shown in FIG. 4.

An integrity protection method is as follows: a transmit end performs EIA processing on the input parameters (the KEY, the COUNT, the MESSAGE, the BEARER, and the DIRECTION) to obtain an expected message authentication code for integrity (MAC-I) or a NAS-MAC. An integrity protection verification method is as follows: performing EIA processing on the input parameters (the KEY, the COUNT, the MESSAGE, the BEARER, and the DIRECTION), to obtain an expected message authentication code for integrity (XMAC-I) or an XNAS-MAC; comparing the XMAC-I with the MAC-I; and if the XMAC-I is consistent with the MAC-I, determining that integrity protection verification succeeds.

The following describes in detail the technical solutions provided in this application.

Figure 5:
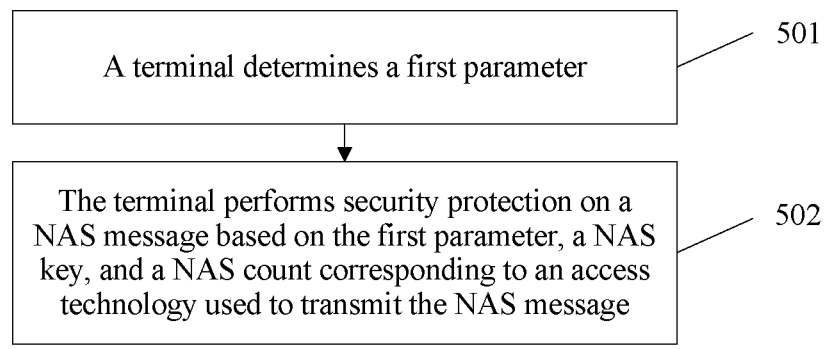
FIG. 5 is a flowchart of a security protection method according to an embodiment of this application.

Based on the network architectures in FIG. 1 and FIG. 2, an embodiment of this application provides a security protection method. In this method, for a process of encryption, decryption, and integrity protection, refer to descriptions in FIG. 3 and FIG. 4. As shown in FIG. 5, the method mainly includes step 501 and step 502.

Step 501: A terminal determines a first parameter.

The first parameter is an input parameter used when the terminal performs security protection on a NAS message, and the first parameter is used to indicate an access technology used to transmit the NAS message. The terminal can support at least two access technologies, and can separately maintain a corresponding NAS COUNT for each of the at least two access technologies. For example, the at least two access technologies comprise a 3GPP access technology and a different access technology that can share the same 3GPP network core network device with the 3GPP access technology, for example, a non-3GPP access technology or a fixed network access technology. Optionally, that the first parameter indicates the access technology used to transmit the NAS message may be further understood to mean that the first parameter is used to indicate a transmission path used by the terminal to transmit the NAS message. For example, the terminal and the AMF node may separately maintain a corresponding NAS COUNT for each transmission path without distinguishing access technologies. If the transmission path used to transmit the NAS message is a path 1, a NAS COUNT corresponding to the path 1 is used. If the transmission path used to transmit the NAS message is a path 2, a NAS COUNT corresponding to the path 2 is used. It may be understood that a transmission path corresponds to an access technology. For example, referring to FIG. 2, an access technology used when data is transmitted on the path 1 is the 3GPP access technology, and an access technology used when data is transmitted on the path 2 is the non-3GPP access technology.

The first parameter may be an input parameter newly added in an encryption and decryption process or an integrity protection process. The parameter includes a preset quantity of bits. Optionally, different access technologies may be represented by setting the bits to different values.

Figure 6:
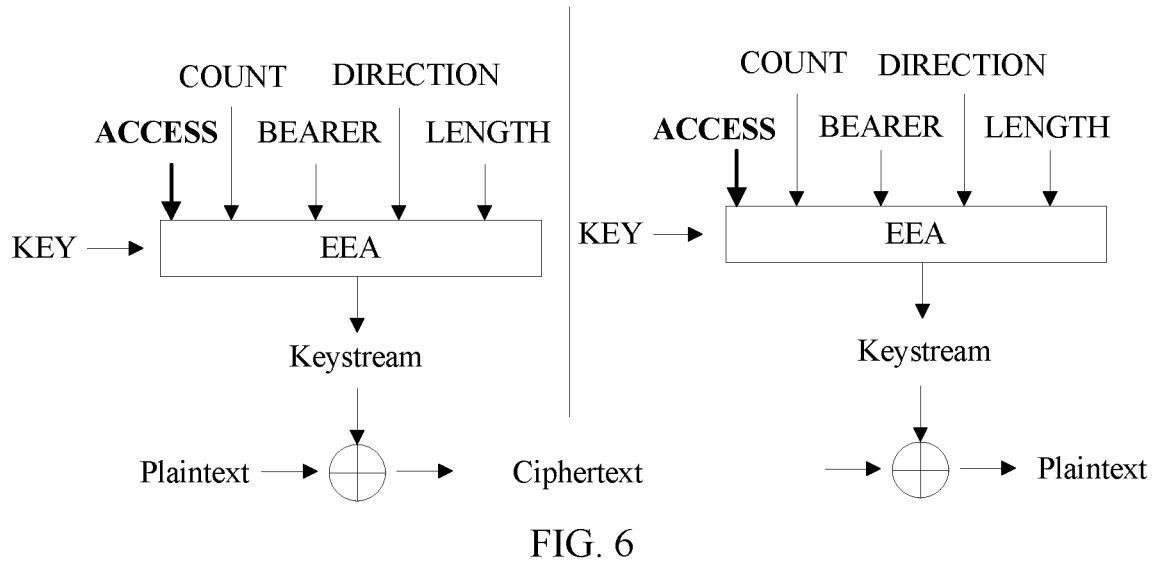
FIG. 6 is an example of a schematic diagram of another encryption and decryption method according to an embodiment of this application.

In a first possible implementation, as shown in FIG. 6, the first parameter may be an ACCESS parameter. For example, if the first parameter is 00, it indicates that the 3GPP access technology is used. If the first parameter is 01, it indicates that the non-3GPP access technology is used. Alternatively, 001 represents the 3GPP access technology, 010 represents a Wi-Fi technology, and 011 represents a fixed network technology.

Alternatively, 001 may be used to represent a first used access technology, 010 may be used to represent a second used access technology, and 011 may be used to represent a third used access technology. In other words, each time a used access technology is switched, the first parameter is increased by 1 until bits of the first parameter are all 1, and then the first parameter may be recounted from 000. For example, if the bits of the first parameter are all changed to 1 after the terminal switches a used access technology a plurality of times, when the terminal needs to switch the used access technology from the first access technology to the second access technology, a first parameter generated for the second access technology is 001. Optionally, in this method, the first access technology, the second access technology, and the third access technology may be a same technology. In other words, when an access technology is reused, the first parameter is increased by 1 until bits of the first parameter are all 1, and then the first parameter may be recounted from 000.

Optionally, each time the parameter COUNT in the input parameters is reset to 0 or a NAS Sequence Number is reset to 0, the first parameter may also be increased by 1.

Optionally, when bits of the first parameter are all 1, a NAS key needs to be updated when the NAS key is used the next time a NAS message is transmitted.

Figure 7:
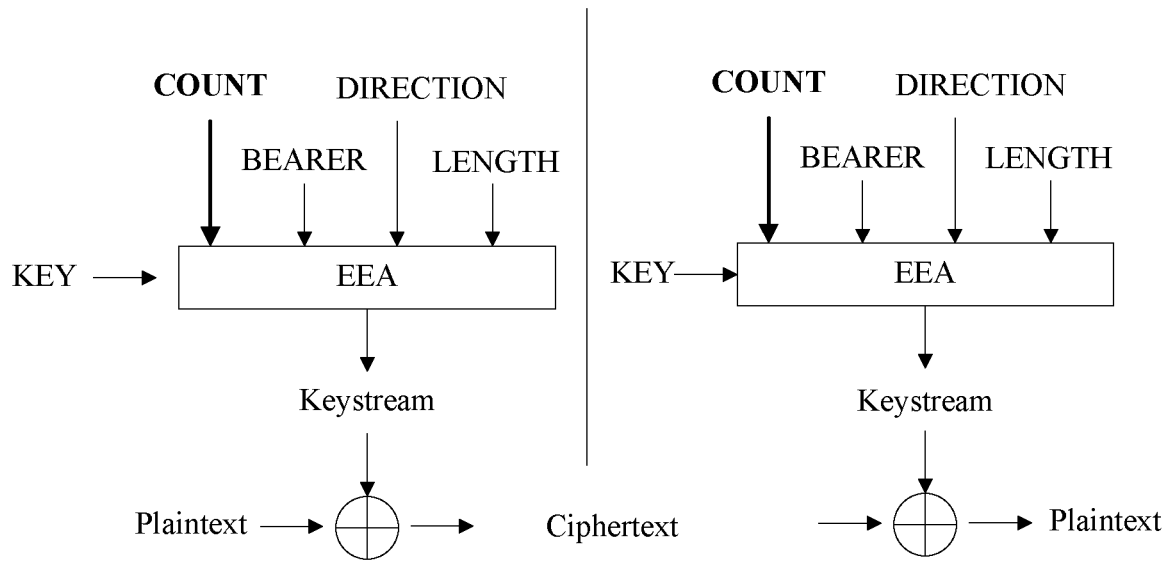
FIG. 7 is an example of a schematic diagram of still another encryption and decryption method according to an embodiment of this application.

In a second possible implementation, as shown in FIG. 7, all or some bits of the parameter COUNT in the input parameters may be used to indicate the access technology used to transmit the NAS message. For example, if the COUNT includes 8 all-0 padding bits and a NAS COUNT, the first parameter may be some or all bits of the 8 bits. For example, the first 3 bits may be selected to indicate the access technology used to transmit the NAS message. For how to distinguish different access technologies using bit values, refer to the related descriptions in the first implementation.

Figure 8:
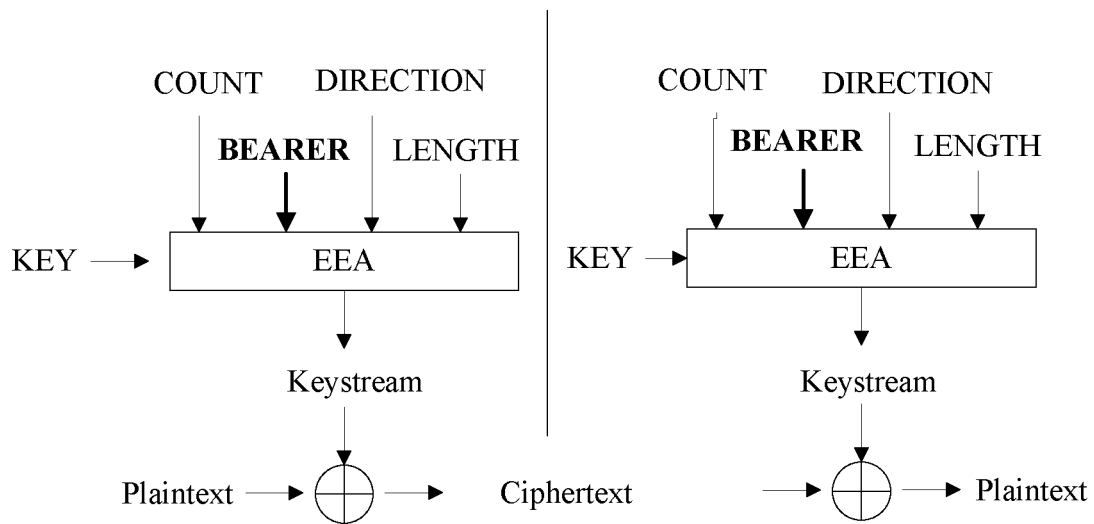
FIG. 8 is an example of a schematic diagram of yet another encryption and decryption method according to an embodiment of this application.

In a third possible implementation, as shown in FIG. 8, the parameter BEARER in the input parameters may be used to indicate the access technology used to transmit the NAS message, or to indicate an access path used to transmit the NAS message, where the first parameter may be a bit some bits, or all bits of the BEARER. For example, the first 3 bits may be selected to indicate the access technology used to transmit the NAS message. For how to distinguish different access technologies using bit values, refer to the related descriptions in the first implementation.

In a fourth possible implementation, a quantity of bits of a COUNT may be increased, and the first parameter comprises some of the bits of the COUNT. For example, the COUNT is extended from 32 bits to 64 bits (a 64-bit COUNT is adapted to a key with a length of 256 bits). A part of the extended COUNT is used to indicate an access technology. For example, three bits are reserved to indicate an access technology, where 000 represents a 3GPP access technology, 001 represents a Wi-Fi access technology, and 010 represents a fixed network access technology.

In a fifth possible implementation, the first parameter may be a NAS COUNT, and a bit of the NAS COUNT may be removed. A quantity of removed bits is used to indicate an access technology.

Optionally, a preset quantity of bits of a NAS overflow in an existing NAS COUNT is removed, and the quantity of the removed bits is used to indicate the access technology. For example, if one bit is removed, it indicates that the access technology is a 3GPP access technology; if two bits are removed, it indicates that the access technology is a Wi-Fi access technology; if three bits are removed, it indicates that the access technology is a fixed network access technology.

Alternatively, a preset quantity of bits of a Sequence Number part of an existing NAS COUNT is removed, and the quantity of the removed bits is used to indicate the access technology. For example, if one bit is removed, it indicates that the access technology is a 3GPP access technology; if two bits are removed, it indicates that the access technology is a Wi-Fi access technology; if three bits are removed, it indicates that the access technology is a fixed network access technology.

Optionally, a first parameter corresponding to each access technology may be preconfigured in the terminal. After determining the access technology used to transmit the NAS message, the terminal may search for a corresponding first parameter based on the access technology used to transmit the NAS message. Alternatively, after determining the access technology used to transmit the NAS message, the terminal generates the first parameter based on the access technology used to transmit the NAS message.

It should be noted that, when the first parameter is a NAS COUNT or the first parameter comprises some bits of a NAS COUNT, the terminal maintains different NAS COUNTs for different supported access technologies. In other cases, the terminal may maintain a same NAS COUNT or a different NAS COUNT for different supported access technologies.

The terminal may independently determine the first parameter, and notify an AMF node of the first parameter. Alternatively, an AMF node determines the first parameter, and notifies the terminal of the first parameter. Alternatively, the first parameter may be preconfigured in the terminal and an AMF node. For example, if the first parameter is determined by the AMF node, the terminal may receive the first parameter from the AMF node. If the first parameter comprises some bits in a NAS COUNT, after receiving the first parameter, the terminal may replace, with the first parameter, specified bits in the NAS COUNT stored by the terminal. Alternatively, if the first parameter comprises some bits in a BEARER, the terminal may replace specified bits in the BEARER with the first parameter.

Step 502: The terminal performs security protection on a NAS message based on the first parameter, a NAS key, and a NAS COUNT corresponding to an access technology used to transmit the NAS message.

The NAS COUNT may be a parameter that has a function of preventing a NAS message replay attack. The NAS key is a NAS key shared by the at least two access technologies that can be supported by the terminal.

That the terminal performs security protection on a NAS message comprises the terminal performing one or more of the following: encrypting a NAS message to be transmitted to a core network device, decrypting a received NAS message, and performing integrity protection on the NAS message to be transmitted to the core network device, or performing integrity protection verification on the received NAS message. Correspondingly, a key used to perform security protection on the NAS message may be an encryption key and an integrity protection key. In this embodiment of this application, the encryption key and the integrity protection key are collectively referred to as NAS keys. An execution sequence of encryption, decryption, production integrity protection, and integrity protection verification is not limited in this embodiment of this application.

It may be understood that the terminal can maintain the corresponding NAS COUNT for each of the at least two access technologies. If the terminal transmits the NAS message using the 3GPP access technology, security protection is performed on the NAS message using a first parameter corresponding to the 3GPP access technology, an uplink NAS COUNT maintained by the terminal for the 3GPP access technology, and the NAS key.

Corresponding to the three implementations of the first parameter, methods for encrypting the NAS message are separately shown in FIG. 6, FIG. 7, and FIG. 8.

Corresponding to the foregoing first implementation, with reference to FIG. 4, an input parameter used when security protection is performed on the NAS message may also be an ACCESS parameter.

Corresponding to the foregoing second implementation, with reference to FIG. 4, a COUNT in the input parameter used when security protection is performed on the NAS message includes the first parameter.

Corresponding to the foregoing third implementation, with reference to FIG. 4, a BEARER in the input parameter used when security protection is performed on the NAS message includes the first parameter.

Optionally, if the terminal receives the NAS message, the terminal may determine the first parameter corresponding to the access technology used to transmit the NAS message, to decrypt and/or perform integrity protection verification on the NAS message using a downlink NAS COUNT carried in the NAS message, the first parameter corresponding to the access technology used to transmit the NAS message, and the NAS key.

According to the security protection method provided in this embodiment of this application, the terminal can separately maintain the corresponding NAS COUNT for each of the at least two access technologies. The terminal does not use one set of NAS COUNTS when transmitting the NAS message using different access technologies. Instead, the terminal performs security protection on the NAS message using a NAS COUNT maintained for a corresponding access technology. This can avoid a replay attack problem that occurs when a core network device first receives a relatively small NAS COUNT transmitted using one link, and then receives a relatively large NAS COUNT transmitted using another link. In this application, the first parameter used to differentiate different access technologies is further used when security protection is performed on the NAS message. Therefore, even though a same NAS key and a same NAS COUNT are used when security protection is performed on a NAS message transmitted using the different access technologies, security protection results of the NAS message are different, reducing a possibility of occurrence of a replay attack, thereby implementing security protection for a plurality of NAS connection links.

Figure 9:
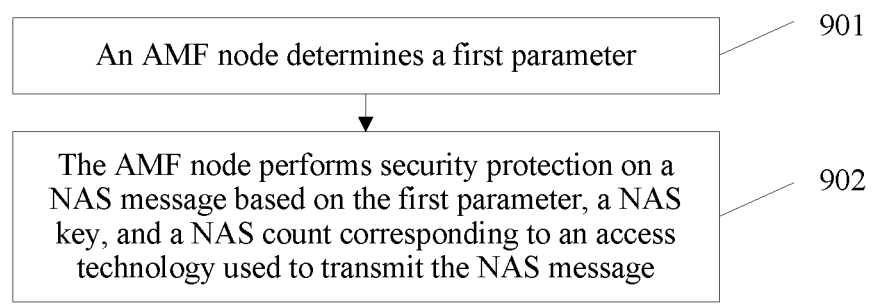
FIG. 9 is a flowchart of another security protection method according to an embodiment of this application.

Corresponding to the embodiment in FIG. 5, a method for performing security protection on a NAS message by a core network device is further provided in another implementation of this embodiment of this application. The core network device may be an AMF node, a SEAF node, an MME node, a node participating in an authentication process of a terminal, or another node related to key generation and key storage. In this embodiment of this application, that the core network device is an AMF node is used as an example. As shown in FIG. 9, the method includes the following steps.

Step 901: The AMF node determines a first parameter.

The first parameter is used to indicate an access technology used to transmit a NAS message. The AMF node can separately maintain a corresponding NAS COUNT for each of at least two access technologies supported by the terminal.

A method for determining the first parameter by the AMF node is similar to the method for determining the first parameter by the terminal in step 501 in FIG. 5, and reference may be made to the related description in step 501.

Step 902: The AMF node performs security protection on a NAS message based on the first parameter, a NAS key, and a NAS COUNT corresponding to an access technology used to transmit the NAS message.

The NAS COUNT may be a parameter that has a function of preventing a NAS message replay attack.

That the AMF node performs security protection on a NAS message may comprise the AMF node performing one or more of the following: encrypting a NAS message to be transmitted to a terminal, decrypting a received NAS message, and performing integrity protection on the NAS message to be transmitted to the terminal, or performing integrity protection verification on the received NAS message.

A method for performing security protection on the NAS message by the AMF node is similar to the method for performing security protection on the NAS message by the terminal in step 502. As such, reference may be made to the related description in step 502.

According to the security protection method provided in this embodiment of this application, the core network device can separately maintain the corresponding NAS COUNT for each of the at least two access technologies. The terminal does not use one set of NAS COUNTs when transmitting the NAS message using different access technologies. Instead, the terminal performs security protection on the NAS message using a NAS COUNT maintained for a corresponding access technology. This can avoid a replay attack problem that occurs when a core network device first receives a relatively small NAS COUNT transmitted by using one link, and then receives a relatively large NAS COUNT transmitted using another link. In this application, the first parameter used to differentiate different access technologies is further used when security protection is performed on the NAS message. Therefore, even though a same NAS key and a same NAS COUNT are used when security protection is performed on a NAS message transmitted using the different access technologies, security protection results of the NAS message are different, thereby reducing a possibility of occurrence of a replay attack, while implementing security protection for a plurality of NAS connection links.

Figure 10:
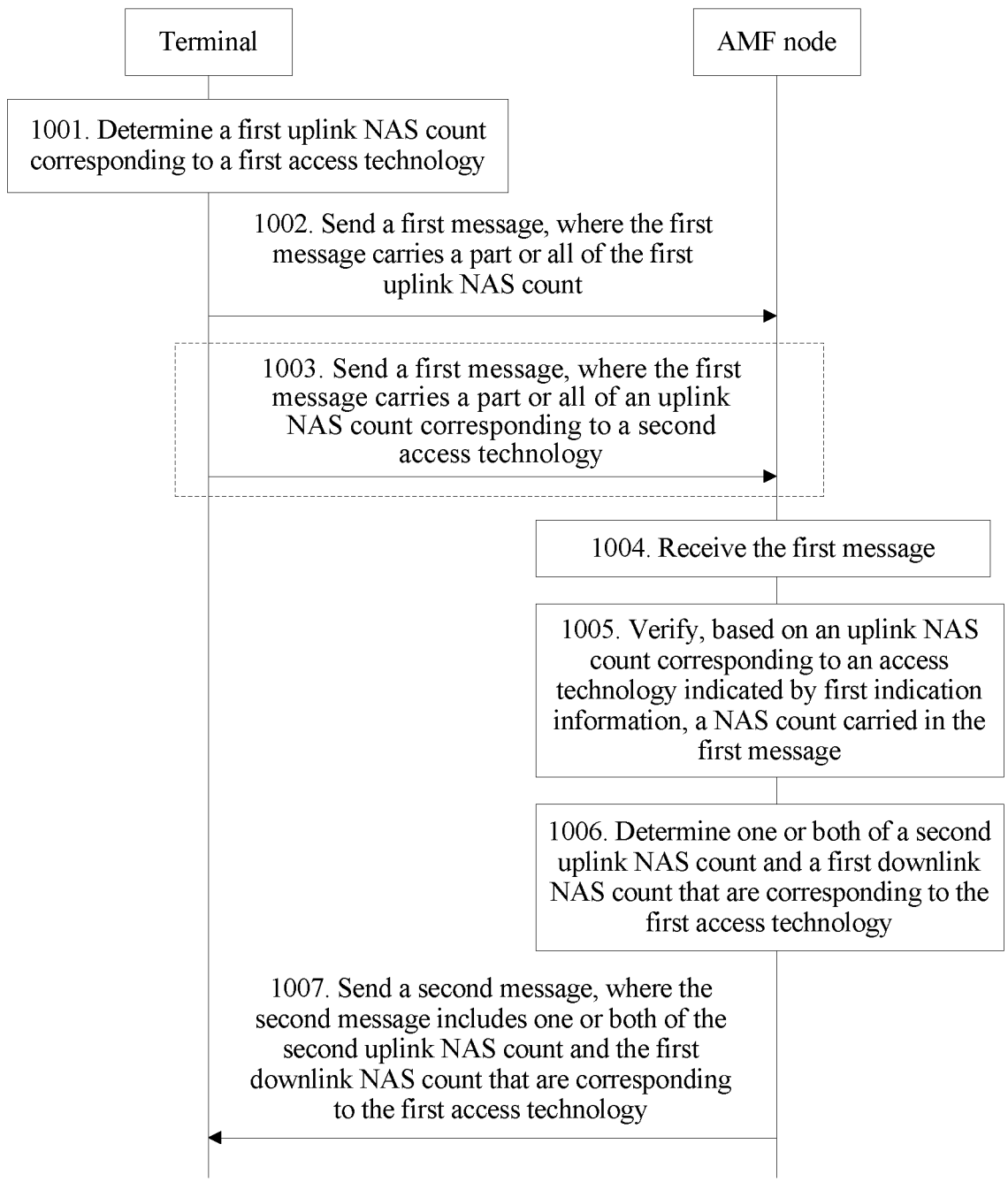
FIG. 10 is a flowchart of still another security protection method according to an embodiment of this application.

Optionally, if the access technology used to transmit the NAS message is a first access technology, before the procedures in FIG. 5 and FIG. 9, as shown in FIG. 10, the method may further include step 1001 to step 1007.

Step 1001: A terminal determines a first uplink NAS COUNT corresponding to the first access technology.

The first uplink NAS COUNT is 0, and further, all or some bits of the first uplink NAS COUNT are 0.

Alternatively, the first uplink NAS COUNT is a random number. In some embodiments, some or all bits in the first uplink NAS COUNT are random numbers. For example, a Sequence Number part or a NAS overflow part of the first uplink NAS COUNT is a random number. In this case, a remaining part is 0.

Alternatively, the at least two access technologies further include a second access technology, and the first uplink NAS COUNT is an uplink NAS COUNT that corresponds to the second access technology and that is stored by the terminal. If the terminal stores at least two uplink NAS COUNTs corresponding to the second access technology, the first uplink NAS COUNT is a largest uplink NAS COUNT that corresponds to the second access technology and that is stored by the terminal.

Alternatively, the at least two access technologies further include a second access technology, and the first uplink NAS COUNT is a sum of 1 and an uplink NAS COUNT that corresponds to the second access technology and that is stored by the terminal. If the terminal stores at least two uplink NAS COUNTs corresponding to the second access technology, the first uplink NAS COUNT is a sum of 1 and a largest uplink NAS COUNT that corresponds to the second access technology and that is stored by the terminal.

Alternatively, the first uplink NAS COUNT is an uplink NAS COUNT that corresponds to the first access technology and that is stored by the terminal. If the terminal stores at least two uplink NAS COUNTs corresponding to the first access technology, the first uplink NAS COUNT is a largest uplink NAS COUNT that corresponds to the first access technology and that is stored by the terminal.

Alternatively, the first uplink NAS COUNT is a sum of 1 and an uplink NAS COUNT that corresponds to the first access technology and that is stored by the terminal. If the terminal stores at least two uplink NAS COUNTs corresponding to the first access technology, the first uplink NAS COUNT is a sum of 1 and a largest uplink NAS COUNT that corresponds to the first access technology and that is stored by the terminal.

Optionally, the first access technology and the second access technology may be separately a 3GPP access technology, a non-3GPP access technology, a fixed network access technology, another technology that can be used to access a core network device, or any technology that can share a 3GPP core network device with the 3GPP access technology. In this embodiment of this application, an example is described in which the first access technology is a non-3GPP access technology and the second access technology is a 3GPP access technology.

It may be understood that, before the terminal sends the NAS message to an AMF node via the non-3GPP access technology, the terminal needs to determine the first uplink NAS COUNT carried when the NAS message is transmitted via the non-3GPP access technology.

If the terminal accesses the AMF node using the non-3GPP access technology for the first time, the first uplink NAS COUNT corresponding to the non-3GPP access technology may be set to 0 or a random number. Alternatively, when the terminal has accessed the AMF node via the 3GPP access technology, if a NAS COUNT maintenance method is the method 1 described above (i.e., after a NAS message is sent, a NAS COUNT used in the NAS message is increased by 1 and stored; and when a NAS message needs to be sent a next time, security protection is performed on the NAS message using the stored NAS COUNT), it may be determined that the first uplink NAS COUNT is an uplink NAS COUNT that corresponds to the 3GPP access technology and that is stored by the terminal. If the terminal stores at least two uplink NAS COUNTs corresponding to the 3GPP access technology and the terminal cannot determine an uplink NAS COUNT used by a previous NAS message, a largest uplink NAS COUNT that corresponds to the 3GPP access technology and that is stored by the terminal is selected, and security protection is performed on the NAS message. If a NAS COUNT maintenance method is the method 2 described above (i.e., after a NAS message is sent, when a NAS message needs to be sent a next time, a stored NAS COUNT is increased by 1 to determine a new NAS COUNT, and security protection is performed on the NAS message using the new NAS COUNT), it may be determined that the first uplink NAS COUNT is a sum of 1 and an uplink NAS COUNT that corresponds to the 3GPP access technology and that is stored by the terminal. If the terminal stores at least two uplink NAS COUNTs corresponding to the 3GPP access technology and the terminal cannot determine an uplink NAS COUNT used by a previous NAS message, a largest uplink NAS COUNT that corresponds to the 3GPP access technology and that is stored by the terminal is selected and is increased by 1, and security protection is performed on the NAS message using the uplink NAS COUNT increased by 1.

When the terminal has accessed the AMF node via the non-3GPP access technology, if the NAS COUNT maintenance method is the foregoing method 1, it may be determined that the first uplink NAS COUNT is the uplink NAS COUNT that corresponds to the non-3GPP access technology and that is stored by the terminal. Alternatively, if the NAS COUNT maintenance method is the foregoing method 2, it may be determined that the first uplink NAS COUNT is a sum of 1 and the uplink NAS COUNT that corresponds to the non-3GPP access technology and that is stored by the terminal.

Step 1002: The terminal sends a first message to an AMF node, where the first message carries some or all bits of the first uplink NAS COUNT.

Security protection is performed on the first message using the first uplink NAS COUNT and a NAS key. Optionally, the first message may carry a 24-bit first uplink COUNT, or may carry only some bits of the first uplink COUNT, for example, carry only last 4 or 8 bits of the first uplink NAS COUNT.

In another possible implementation, if the terminal accesses, for the first time, the AMF node via the non-3GPP access technology, and the terminal has accessed the AMF node via the 3GPP access technology, the terminal may temporarily not determine the first uplink NAS COUNT, and perform security protection firstly on the first message using a NAS COUNT corresponding to the non-3GPP access technology. In other words, step 1001 and step 1002 may be replaced with step 1003.

Step 1003: The terminal sends a first message to an AMF node, where the first message carries some or all bits of an uplink NAS COUNT corresponding to a second access technology.

Security protection is performed on the first message using the NAS key and the uplink NAS COUNT corresponding to the second access technology.

The uplink NAS COUNT that corresponds to the second access technology and is carried in the first message may comprise some or all bits of the uplink NAS COUNT that corresponds to the second access technology and that is stored by the terminal. Alternatively, the uplink NAS COUNT may comprise some or all bits of a new uplink NAS COUNT obtained after the uplink NAS COUNT that corresponds to the second access technology and that is stored by the terminal is increased by 1. If the terminal stores at least two uplink NAS COUNTS corresponding to the second access technology, the uplink NAS COUNT corresponding to the second access technology in this step is a largest uplink NAS COUNT that corresponds to the second access technology and that is stored by the terminal.

Optionally, the first message in step 1002 and that in step 1003 both include first indication information, where the first indication information is used to indicate an access technology corresponding to some or all bits of the uplink NAS COUNT carried in the first message. Alternatively, the first indication information is used to indicate a transmission path corresponding to some or all bits of the NAS COUNT carried in the first message. For example, the first indication information carried in the first message in step 1002 indicates the non-3GPP access technology, and the first indication information carried in the first message in step 1003 indicates the 3GPP access technology. For another example, the first indication information carried in the first message in step 1002 indicates accessing the AMF node via a path 1, and the first indication information carried in the first message in step 1003 indicates accessing the AMF node via a path 2.

The following steps may be further performed after step 1002 or step 1003.

Step 1004: The AMF node receives the first message.

Step 1005: The AMF node verifies, based on an uplink NAS COUNT corresponding to an access technology indicated by first indication information, a NAS COUNT carried in the first message.

Indication information may be an explicit indication or an implicit notification. For example, access type information may comprise access type indication information (such as an access type of a radio access technology (RAT) type) that is explicitly indicated in an N2 message. Alternatively, access type information may comprise access type indication information that is added in the NAS message. The AMF node may determine an access type based on a source of the first message when there is no access type indication information. For example, if a source address of the message is a base station, an access type is 3GPP access; if a source address of the message is an N3IWF node, an access type is non-3GPP access; if a source address of the message is a device connected to a fixed network, an access type is fixed network access.

When the first indication information indicates the non-3GPP access technology, if the first message carries a complete first NAS COUNT and the AMF node determines that the terminal has accessed the AMF node, the AMF node determines whether the first NAS COUNT is greater than a previously received uplink NAS COUNT that corresponds to the non-3GPP access technology and that is stored by the AMF node. If the first NAS COUNT is greater than the previously received uplink NAS COUNT, the verification succeeds. However, if the first NAS COUNT is less than the previously received uplink NAS COUNT, the authentication fails, in which case access of the terminal is rejected and the terminal is informed of a failure reason. Optionally, if the AMF node determines that the terminal has not accessed the AMF node using the non-3GPP access technology, the AMF node stores the first NAS COUNT as the uplink NAS COUNT corresponding to the non-3GPP access technology, or the AMF node determines that the uplink NAS COUNT corresponding to the non-3GPP access technology is 0. If the first message carries a part of the first NAS COUNT, the AMF node first recovers the complete first NAS COUNT, and then verifies or saves the first NAS COUNT according to the foregoing method for processing the first NAS COUNT.

When the first indication information indicates the 3GPP access technology, if the first message carries a complete NAS COUNT corresponding to the 3GPP access technology, the AMF node determines whether the first NAS COUNT is greater than a previously received uplink NAS COUNT that corresponds to the 3GPP access technology and that is stored by the AMF node. If the first NAS COUNT is greater than the previously received uplink NAS COUNT, the verification succeeds. However, if the first NAS COUNT is less than the previously received uplink NAS COUNT, the authentication fails. If the first message carries a part of a NAS COUNT corresponding to the 3GPP access technology, the AMF node first recovers the complete NAS COUNT, and then verifies the recovered complete COUNT using the foregoing method for verifying the NAS COUNT.

Step 1006: The AMF node determines one or both of a second uplink NAS COUNT and a first downlink NAS COUNT that correspond to the first access technology.

The second uplink NAS COUNT is 0, and further, all or some bits of the second uplink NAS COUNT are 0. Alternatively, the second uplink NAS COUNT is a random number. In some embodiments, some or all bits in the second uplink NAS COUNT are random numbers. For example, a Sequence Number part or a NAS overflow part of the second uplink NAS COUNT is a random number. In this case, a remaining part is 0. Alternatively, the second uplink NAS COUNT is a downlink NAS COUNT that corresponds to the second access technology and that is stored by the core network device. If the core network device stores at least two downlink NAS COUNTs corresponding to the second access technology, the second uplink NAS COUNT is a largest downlink NAS COUNT that corresponds to the second access technology and that is stored by the core network device. Alternatively, the second uplink NAS COUNT is a sum of 1 and a downlink NAS COUNT that corresponds to the second access technology and that is stored by the core network device. If the core network device stores at least two downlink NAS COUNTs corresponding to the second access technology, the second uplink NAS COUNT is a sum of 1 and a largest downlink NAS COUNT that corresponds to the second access technology and that is stored by the core network device. Alternatively, the second uplink NAS COUNT is a sum of 1 and a downlink NAS COUNT that corresponds to the first access technology and that is stored by the core network device. If the core network device stores at least two downlink NAS COUNTs corresponding to the first access technology, the second uplink NAS COUNT is a sum of 1 and a largest downlink NAS COUNT that corresponds to the first access technology and that is stored by the core network device. Alternatively, the second uplink NAS COUNT is the first uplink NAS COUNT; or the second uplink NAS COUNT is a sum of 1 and the first uplink NAS COUNT.

Optionally, if the first message received by the AMF node carries the first uplink NAS COUNT, the AMF node may determine that the second uplink NAS COUNT is the first uplink NAS COUNT, or that the second uplink NAS COUNT is a sum of 1 and the first uplink NAS COUNT.

Alternatively, if the first message received by the AMF node carries the first uplink NAS COUNT, it indicates that the terminal has determined the NAS COUNT corresponding to the non-3GPP access technology, and the AMF node may not determine a second NAS COUNT.

The first downlink NAS COUNT is 0, and further, all or some bits of the first downlink NAS COUNT are 0.

Alternatively, the first downlink NAS COUNT is a random number. In some embodiments, some or all bits in the first downlink NAS COUNT are random numbers. For example, a Sequence Number part or a NAS overflow part of the first uplink NAS COUNT is a random number. In this case, a remaining part is 0. Alternatively, the first downlink NAS COUNT is a downlink NAS COUNT that corresponds to the second access technology and that is stored by the core network device. If the core network device stores at least two downlink NAS COUNTs corresponding to the second access technology, the first downlink NAS COUNT is a largest downlink NAS COUNT that corresponds to the second access technology and that is stored by the core network device. Alternatively, the first downlink NAS COUNT is a sum of 1 and a downlink NAS COUNT that corresponds to the second access technology and that is stored by the core network device. If the core network device stores at least two downlink NAS COUNTs corresponding to the second access technology, the first downlink NAS COUNT is a sum of 1 and a largest downlink NAS COUNT that corresponds to the second access technology and that is stored by the core network device. Alternatively, the first downlink NAS COUNT is a sum of 1 and a downlink NAS COUNT that corresponds to the first access technology and that is stored by the core network device. If the core network device stores at least two downlink NAS COUNTs corresponding to the first access technology, the first downlink NAS COUNT is a sum of 1 and a largest downlink NAS COUNT that corresponds to the first access technology and that is stored by the core network device.

Optionally, if the first message received by the AMF node carries the NAS COUNT corresponding to the second access technology, the second uplink NAS COUNT determined by the AMF node may be the same as the first downlink NAS COUNT.

Step 1007: The AMF node sends a second message to the terminal, where the second message includes one or both of the second uplink NAS COUNT and the first downlink NAS COUNT that correspond to the first access technology.

Correspondingly, the terminal receives the second message.

Optionally, the second message carries second indication information, and the second indication information is used to indicate an access technology corresponding to the first downlink NAS COUNT carried in the second message. Optionally, the second message may further carry indication information used to indicate the second uplink NAS COUNT carried in the second message. Optionally, the second indication information is used to indicate a transmission path corresponding to the first downlink NAS COUNT carried in the second message. Optionally, the second message may further carry indication information that is used to indicate a transmission path corresponding to the second uplink NAS COUNT carried in the second message. It may be understood that, because the second message carries the first downlink NAS COUNT corresponding to the first access technology, the second indication information is used to indicate the first access technology. For example, if the first access technology is the 3GPP access technology, the second indication information is used to indicate the 3GPP access technology; if the first access technology is the non-3GPP access technology, the second indication information is used to indicate the non-3GPP access technology.

It may be understood that, after receiving the second message, the terminal may save one or both of the second uplink NAS COUNT and the first downlink NAS COUNT that are carried in the second message. When the next time an uplink NAS message needs to be sent via the non-3GPP, security protection may be performed on the NAS message based on the second uplink NAS COUNT. Alternatively, after receiving a downlink NAS message, a downlink NAS COUNT in the received downlink NAS message may be verified based on the first downlink NAS COUNT.

Figure 11A:
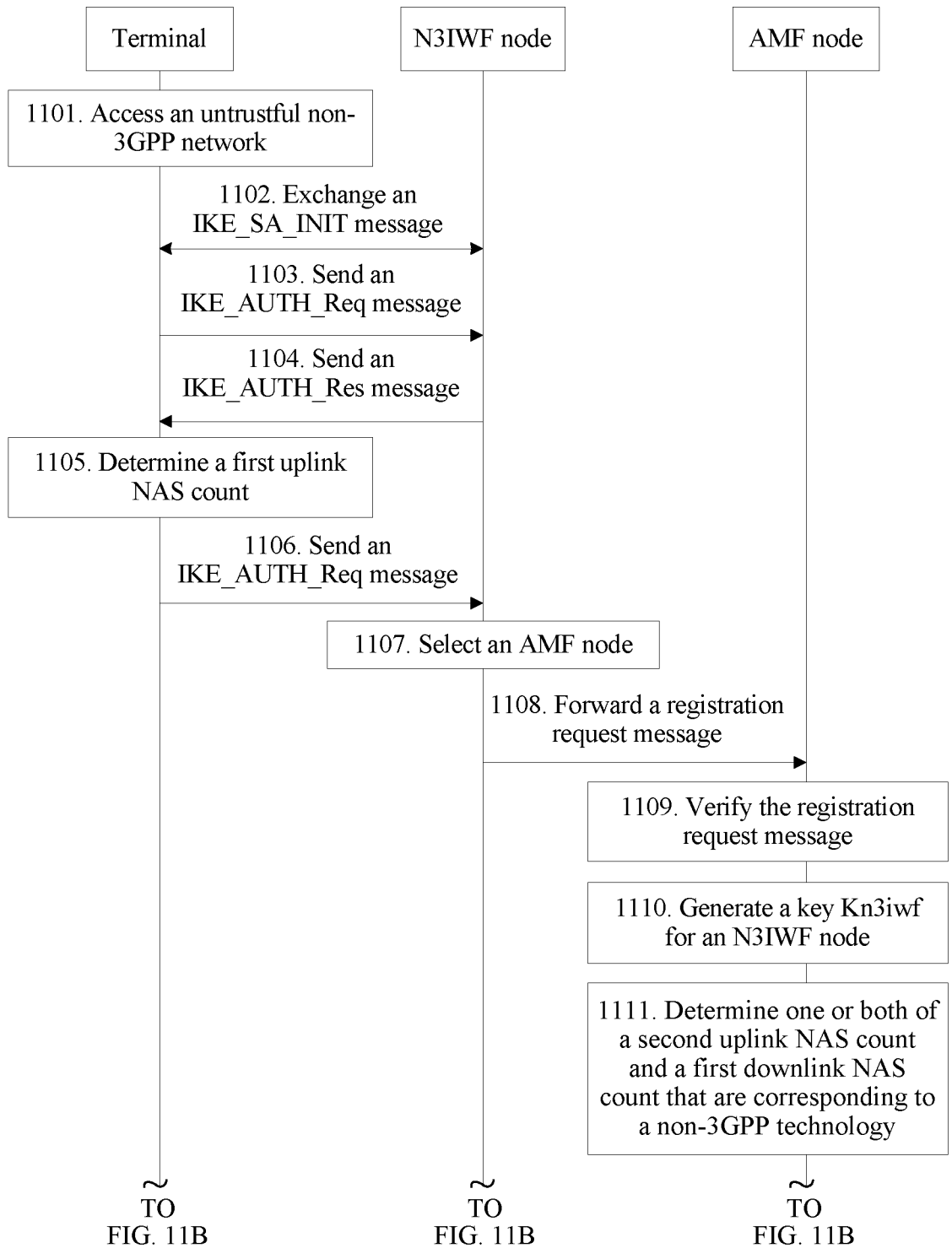
FIG. 11A and FIG. 11B are flowcharts of yet another security protection method according to an embodiment of this application.
Figure 11B:
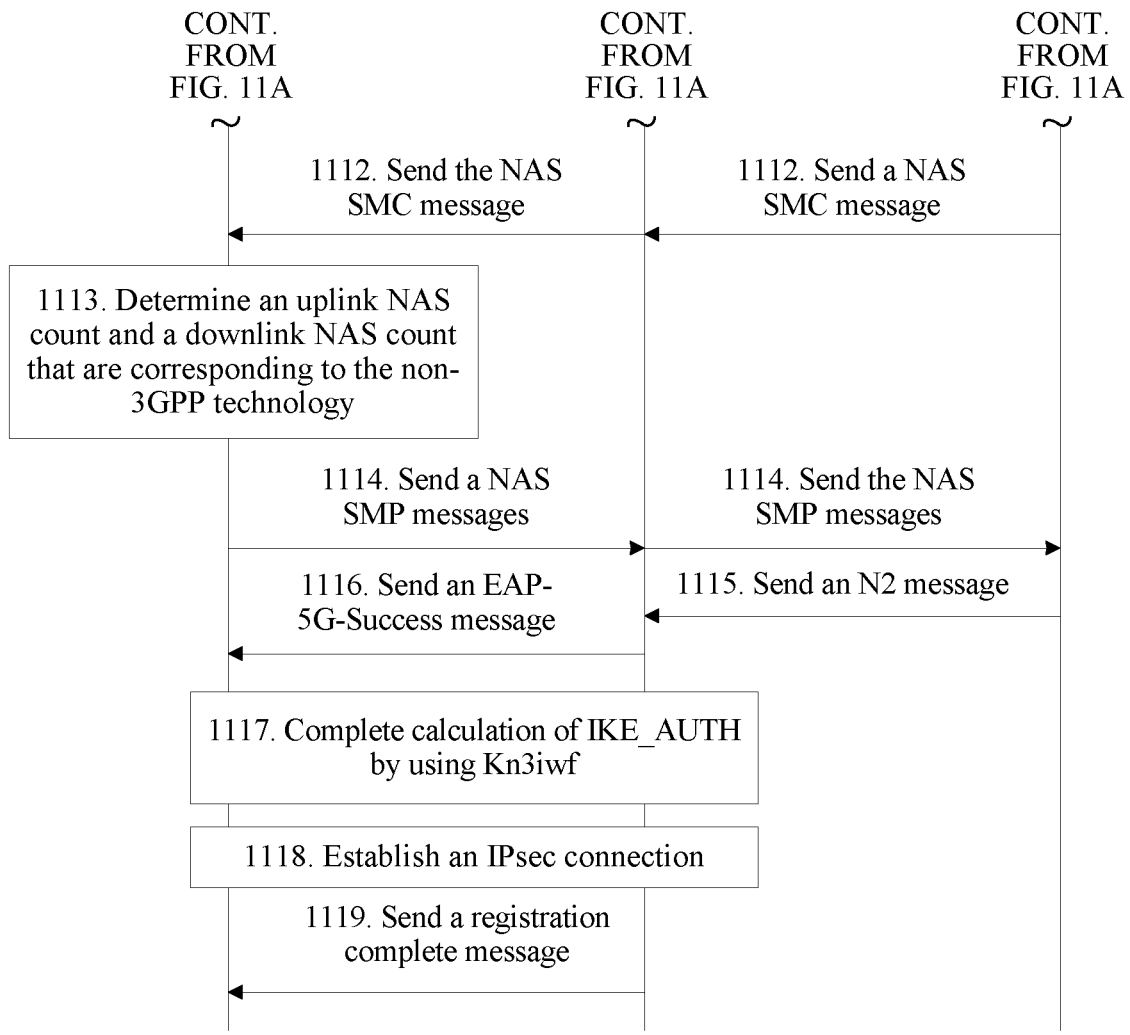

With reference to an example scenario, the following describes the security protection method described in the foregoing embodiments. An embodiment of this application may be applied to a scenario in which a terminal has accessed an AMF node using a 3GPP access technology, and then the terminal accesses the same AMF node using a non-3GPP access technology. FIG. 11A and FIG. 11B show a registration process in which the terminal accesses the AMF node using the non-3GPP access technology. The method includes the following steps.

Step 1101: The terminal accesses an untrusted non-3GPP network.

For example, the terminal accesses a Wi-Fi network that cannot be directly trusted.

In this step, the terminal accesses the untrusted non-3GPP network, and the terminal has been authenticated by a 3GPP network and has a NAS security context. The NAS security context includes a NAS key, a key identifier, and a NAS COUNT corresponding to the 3GPP access technology. Optionally, the NAS context further includes a NAS COUNT corresponding to the non-3GPP access technology. If the terminal has accessed the AMF node via the non-3GPP access technology, the NAS COUNT corresponding to the non-3GPP access technology is not 0. If the terminal has not accessed the AMF node via the non-3GPP access technology, the NAS COUNT corresponding to the non-3GPP access technology is 0.

The NAS key may be one or both of an encryption key and an integrity protection key.

Step 1102: The terminal exchanges an Internet Key Exchange Protocol security association initial (IKE_SA_INIT) message with an N3IWF node.

The IKE_SA_INIT message carries a key material, and the key material is information used to perform security protection on a message transmitted between the terminal and the N3IWF node. After the terminal exchanges the IKE_SA_INIT message with the N3IWF node, the terminal and the N3IWF node may generate a same key, and the key is used to perform security protection on a message subsequently transmitted by the terminal and the N3IWF node.

Step 1103: The terminal sends an Internet Key Exchange Protocol authentication request (IKE_AUTH_Req) message to the N3IWF node.

Correspondingly, the N3IWF node receives the IKE_AUTH_Req message.

Step 1104: The N3IWF node sends an Internet Key Exchange Protocol authentication response (IKE_AUTH_Res) message to the terminal.

Correspondingly, the terminal receives the IKE_AUTH_Res message.

The IKE_AUTH_Res message carries a 5G start message of an Extensible Authentication Protocol 5th Generation request (EAP_5G_Req) message, and the EAP_5G_Req message is used to request the terminal to start an Extensible Authentication Protocol (EAP) procedure.

Step 1105: The terminal determines a first uplink NAS COUNT.

The first uplink NAS COUNT is a COUNT used to perform security protection on the NAS message sent by the terminal to the AMF node.

There are two implementations of this step.

In a first implementation, the terminal determines the first uplink NAS COUNT based on an uplink NAS COUNT corresponding to the 3GPP access technology.

Because the terminal has accessed the AMF node via the 3GPP access technology, the terminal has stored a NAS COUNT corresponding to the 3GPP access technology. If a NAS COUNT maintenance method is the foregoing method 1, it can be determined that the first uplink NAS COUNT is the uplink NAS COUNT that corresponds to the 3GPP access technology and that is stored by the terminal (if the terminal stores at least two uplink NAS COUNTs corresponding to the 3GPP access technology, the first uplink NAS COUNT is a largest uplink NAS COUNT that corresponds to the 3GPP access technology and that is stored by the terminal). If a NAS COUNT maintenance method is the foregoing method 2, it can be determined that the first uplink NAS COUNT is a sum of 1 and an uplink NAS COUNT that corresponds to the non-3GPP access technology and that is stored by the terminal (if the terminal stores at least two uplink NAS COUNTs corresponding to the non-3GPP access technology, the first uplink NAS COUNT is a sum of 1 and a largest uplink NAS COUNT that corresponds to the non-3GPP access technology and that is stored by the terminal).

In a second implementation, the terminal generates a NAS COUNT corresponding to the non-3GPP access technology, and uses, as the first uplink NAS COUNT, the NAS COUNT corresponding to the non-3GPP access technology.

In some embodiments, the first uplink NAS COUNT may be 0, or may be a random number.

If the first uplink NAS COUNT is 0, all or some bits of the first uplink NAS COUNT are 0. If the first uplink NAS COUNT is a random number, some or all bits in the first uplink NAS COUNT are random numbers. For example, last 8 bits (a Sequence Number part) of the first uplink NAS COUNT are random numbers, or a NAS overflow part is a random number, and a remaining part is 0.

Optionally, if the terminal has accessed the AMF node via the non-3GPP access technology, the terminal may determine that the first uplink NAS COUNT is the uplink NAS COUNT that corresponds to the non-3GPP access technology and that is stored by the terminal (if the terminal stores at least two uplink NAS COUNTs corresponding to the non-3GPP access technology, the first uplink NAS COUNT is a largest uplink NAS COUNT that corresponds to the non-3GPP access technology and that is stored by the terminal), or the terminal may determine that the first uplink NAS COUNT is a sum of 1 and a NAS COUNT that corresponds to the non-3GPP access technology and that is stored by the terminal (if the terminal stores at least two uplink NAS COUNTs corresponding to the non-3GPP access technology, the first uplink NAS COUNT is a sum of 1 and a largest uplink NAS COUNT that corresponds to the non-3GPP access technology and that is stored by the terminal).

Optionally, if the first uplink NAS COUNT is determined in the second implementation, in a registration process in which the terminal accesses the AMF node using the non-3GPP access technology, the terminal does not send a NAS message using the 3GPP access technology.

Optionally, the terminal may further set an indicator. The indicator is equivalent to the first indication information in the embodiment corresponding to FIG. 10, and is used to indicate whether the first uplink NAS COUNT corresponds to the 3GPP access technology or the non-3GPP access technology. It may be understood that, if the terminal determines the first uplink NAS COUNT in the foregoing first implementation, the indicator indicates the 3GPP access technology; or if the terminal determines the first uplink NAS COUNT in the foregoing second implementation, the indicator indicates the non-3GPP access technology.

Step 1106: The terminal sends an IKE_AUTH_Req message to the N3IWF node.

Correspondingly, the N3IWF node receives the IKE_AUTH_Req message.

The IKE_AUTH_Req message includes a NAS protocol data unit (PDU) and an Extensible Authentication Protocol for transporting 5G non-access stratum message (a 5G-NAS message corresponding to an EAP_5G_ReS message), or a 5G-NAS message. The NAS PDU includes a registration request message. The registration request message is used by the terminal to register with the AMF node via the 3GPP access technology. Optionally, the first message in the foregoing embodiment may be the registration request message.

Optionally, integrity protection may be performed on the registration request message using the first uplink NAS COUNT, and the registration request message includes the first indication information and the first uplink NAS COUNT. Optionally, the registration request message further includes the key identifier and a temporary identifier of the terminal.

Step 1107: The N3IWF node selects an AMF node.

For a method for selecting the AMF node by the N3IWF node, refer to conventional approaches.

Step 1108: The N3IWF node forwards a registration request message to the AMF node.

Correspondingly, the AMF node receives the registration request message.

Step 1109: The AMF node verifies the registration request message.

The verification performed on the registration request message by the AMF node includes integrity protection verification performed on the registration request message and verification performed on the first uplink NAS COUNT carried in the registration request message. That the AMF node verifies the first uplink NAS COUNT carried in the registration request message corresponds to the foregoing step 1005.

The AMF node may generate an integrity protection key based on the temporary identifier and the key identifier in the registration request message, and perform integrity protection verification on the registration request message based on the integrity protection key.

If the access technology that corresponds to the first uplink NAS message and that is indicated by the first indication information is the 3GPP access technology, the AMF node verifies whether the first uplink NAS COUNT is greater than a previously received NAS COUNT corresponding to the 3GPP access technology. If the first uplink NAS COUNT is greater than the previously received NAS COUNT, the verification succeeds; or if the first uplink NAS COUNT is not greater than the previously received NAS COUNT, the verification fails.

If the access technology that corresponds to the first uplink NAS message and that is indicated by the first indication information is the non-3GPP access technology, and the terminal has not accessed the AMF node via the non-3GPP access technology, the AMF node stores the first NAS COUNT as the uplink NAS COUNT corresponding to the non-3GPP access technology, or the AMF node determines that the uplink NAS COUNT corresponding to the non-3GPP access technology is 0. The terminal has accessed the AMF node via the non-3GPP access technology. The AMF node verifies whether the first uplink NAS COUNT is greater than a previously received NAS COUNT corresponding to the non-3GPP access technology. If the first uplink NAS COUNT is greater than the previously received NAS COUNT, the verification succeeds; or if the first uplink NAS COUNT is not greater than the previously received NAS COUNT, the verification fails.

Step 1110: The AMF node generates a key Kn3iwf for the N3IWF node.

The key Kn3iwf is used for two-way authentication between the AMF node and the terminal.

Step 1111: The AMF node determines one or both of a second uplink NAS COUNT and a first downlink NAS COUNT that are corresponding to the non-3GPP access technology.

Optionally, if the access technology indicated by the first indication information is the 3GPP access technology, it indicates that the terminal does not determine the NAS COUNT for the non-3GPP access technology, and the AMF node may determine the second uplink NAS COUNT and the first downlink NAS COUNT that are corresponding to the non-3GPP access technology. If the access technology indicated by the first indication information is the non-3GPP access technology, it indicates that the terminal determines the uplink NAS COUNT for the non-3GPP access technology, and the AMF node needs to determine only the first downlink NAS COUNT corresponding to the non-3GPP technology, or the AMF node determines the first downlink NAS COUNT and redetermines the uplink NAS COUNT of the non-3GPP access technology.

In some embodiments, the second uplink NAS COUNT is 0, or the second uplink NAS COUNT is a random number.

If the second uplink NAS COUNT is 0, all or some bits of the second uplink NAS COUNT are 0. If the second uplink NAS COUNT is a random number, some or all bits in the second uplink NAS COUNT are random numbers. For example, last 8 bits (a Sequence Number part) of the second uplink NAS COUNT are random numbers, or a NAS overflow part is a random number, and a remaining part is 0. Optionally, if the second uplink NAS COUNT is a random number, the second uplink NAS COUNT needs to be greater than a downlink NAS COUNT that corresponds to the 3GPP access technology and that is stored by the AMF node (if the AMF node stores at least two downlink NAS COUNTs corresponding to the 3GPP access technology, the second uplink NAS COUNT needs to be greater than a largest downlink NAS COUNT that corresponds to the 3GPP access technology and that is stored by the AMF node).

The second uplink NAS COUNT may be a downlink NAS COUNT that corresponds to the 3GPP access technology and that is stored by the AMF node (if the AMF node stores at least two downlink NAS COUNTs corresponding to the 3GPP access technology, the second uplink NAS COUNT is a largest downlink NAS COUNT that corresponds to the 3GPP access technology and that is stored by the terminal). Alternatively, the second uplink NAS COUNT is a sum of 1 and a downlink NAS COUNT that corresponds to the 3GPP access technology and that is stored by the AMF node (if the AMF node stores at least two downlink NAS COUNTs corresponding to the 3GPP access technology, the second uplink NAS COUNT is a sum of 1 and a largest downlink NAS COUNT that corresponds to the 3GPP access technology and that is stored by the terminal). Alternatively, the second uplink NAS COUNT may be a sum of 1 and a downlink NAS COUNT that corresponds to the non-3GPP access technology and that is stored by the AMF node (if the AMF node stores at least two downlink NAS COUNTs corresponding to the non-3GPP access technology, the second uplink NAS COUNT is a sum of 1 and a largest downlink NAS COUNT that corresponds to the non-3GPP access technology and that is stored by the terminal). Alternatively, the second uplink NAS COUNT is the first uplink NAS COUNT; or the second uplink NAS COUNT is a sum of 1 and the first uplink NAS COUNT.

Optionally, the first downlink NAS COUNT may be the same as the second uplink NAS COUNT.

In some embodiments, the first downlink NAS COUNT may be 0, or may be a random number.

If the first downlink NAS COUNT is 0, all or some bits of the first downlink NAS COUNT are 0. If the first downlink NAS COUNT is a random number, some or all bits in the first downlink NAS COUNT are random numbers. For example, last 8 bits (a Sequence Number part) of the first downlink NAS COUNT are random numbers, or a NAS overflow part is a random number, and a remaining part is 0. Optionally, if the first downlink NAS COUNT is a random number, the first downlink NAS COUNT needs to be greater than a largest downlink NAS COUNT that corresponds to the 3GPP access technology and that is stored by the AMF node.

Alternatively, the first downlink NAS COUNT may be a downlink NAS COUNT that corresponds to the 3GPP access technology and that is stored by the AMF node (if the AMF node stores at least two downlink NAS COUNTs corresponding to the 3GPP access technology, the first downlink NAS COUNT may further be a largest downlink NAS COUNT that corresponds to the 3GPP access technology and that is stored by the AMF node). Alternatively, the first downlink NAS COUNT may be a sum of 1 and a downlink NAS COUNT that corresponds to the 3GPP access technology and that is stored by the AMF node (if the AMF node stores at least two downlink NAS COUNTs corresponding to the 3GPP access technology, the first downlink NAS COUNT may further be a sum of 1 and a largest downlink NAS COUNT that corresponds to the 3GPP access technology and that is stored by the AMF node). Alternatively, the first downlink NAS COUNT may be a sum of 1 and a downlink NAS COUNT that corresponds to the non-3GPP access technology and that is stored by the AMF node (if the AMF node stores at least two downlink NAS COUNT corresponding to the non-3GPP access technology, the first downlink NAS COUNT may further be a sum of 1 and a largest downlink NAS COUNT that corresponds to the non-3GPP access technology and that is stored by the AMF node).

It should be noted that the AMF node may store one or both of the generated second uplink NAS COUNT and the generated first downlink NAS COUNT. The AMF node may maintain an uplink NAS COUNT and a downlink NAS COUNT that are corresponding to the 3GPP access technology, and may further maintain an uplink NAS COUNT and a downlink NAS COUNT that are corresponding to the non-3GPP access technology. If the AMF node generates the second uplink NAS COUNT and the first downlink NAS COUNT, the AMF node stores the second uplink NAS COUNT and the first downlink NAS COUNT. If the AMF node generates only the first downlink NAS COUNT, the AMF node stores the first downlink NAS COUNT. In this case, the uplink NAS COUNT that corresponds to the non-3GPP access technology and that is maintained by the terminal is the first uplink NAS COUNT.

It may be understood that the AMF node separately maintains a set of NAS COUNTs for each of the 3GPP access technology and the non-3GPP access technology, in other words, magnitudes of the NAS COUNTs maintained by the AMF node for the 3GPP access technology and magnitudes of the NAS COUNTs maintained by the AMF node for the non-3GPP access technology do not affect each other. When receiving the uplink NAS message, the AMF node may determine, based on bit information in the uplink NAS message or information in an N2 message, an access technology or a transmission path used by the terminal to transmit the uplink NAS message. If the used access technology is the 3GPP access technology, the uplink NAS COUNT carried in the uplink NAS message may be compared with a largest uplink NAS COUNT maintained for the 3GPP access technology. If the used access technology is the non-3GPP access technology, the uplink NAS COUNT carried in the uplink NAS message may be compared with a largest uplink NAS COUNT maintained for the non-3GPP access technology, to prevent a replay attack.

Step 1112: The AMF node sends a NAS security mode command (SMC) message to the terminal using the N3IWF node.

Correspondingly, the terminal receives the NAS SMC message.

The second message in the foregoing embodiment may be the NAS SMC message.

The NAS SMC message carries one or both of the second uplink NAS COUNT and the first downlink NAS COUNT. It may be understood that if the AMF node determines only the first downlink NAS COUNT, the NAS SMC message carries the first downlink NAS COUNT. If the AMF node determines the second uplink NAS COUNT and the first downlink NAS COUNT, the NAS SMC message carries the second uplink NAS COUNT and the first downlink NAS COUNT.

Optionally, if the NAS message carries only the first downlink NAS COUNT, the NAS message may further carry indication information used to instruct the terminal to continue using the uplink NAS COUNT determined by the terminal.

Optionally, the NAS SMC message further includes second indication information, and the second indication information is used to indicate an access technology or a transmission path corresponding to the NAS COUNT carried in the NAS SMC message. In a scenario of this embodiment, the access technology indicated by the second indication information is the non-3GPP access technology.

Step 1113: The terminal determines, based on the NAS SMC message, an uplink NAS COUNT and a downlink NAS COUNT that are corresponding to the non-3GPP access technology.

The terminal may separately maintain a set of NAS COUNTs for each of the 3GPP access technology and the non-3GPP access technology. In a scenario of this embodiment, the terminal has stored the uplink NAS COUNT and the downlink NAS COUNT that are corresponding to the 3GPP access technology, and the terminal may further determine, based on the NAS SMC message received in this step, an uplink NAS COUNT and a downlink NAS COUNT that are maintained for the non-3GPP.

Optionally, if the NAS SMC message includes only the first downlink NAS COUNT, the terminal determines that the uplink NAS COUNT corresponding to the non-3GPP access technology is still the first uplink NAS COUNT, and the downlink NAS COUNT corresponding to the non-3GPP access technology is the first downlink NAS COUNT. If the NAS SMC message includes the second uplink NAS COUNT and the first downlink NAS COUNT, the terminal may determine that the uplink NAS COUNT corresponding to the non-3GPP access technology is the second uplink NAS COUNT, and the downlink NAS COUNT corresponding to the non-3GPP access technology is the first downlink NAS COUNT.

It may be understood that when receiving a downlink NAS message, the terminal may determine, based on bit information in the downlink NAS message, an access technology or a transmission path used by the terminal to transmit the downlink NAS message. If the used access technology is the 3GPP access technology, a downlink NAS COUNT carried in the downlink NAS message may be compared with the largest downlink NAS COUNT maintained for the 3GPP access technology. If the used access technology is the non-3GPP access technology, a downlink NAS COUNT carried in the downlink NAS message may be compared with the largest downlink NAS COUNT maintained for the non-3GPP access technology, to prevent a replay attack.

Step 1114: The terminal sends a NAS security mode complete (SMP) message to the AMF node using the N3IWF node.

Correspondingly, the AMF node receives the NAS SMP message.

Optionally, the NAS message in step 502 may be the NAS SMP message in this step.

The terminal may perform integrity protection on the NAS SMP message using the first parameter, the uplink NAS COUNT, and the NAS key. The first parameter is used to indicate that an access technology used to transmit the NAS SMP message is the non-3GPP access technology. Alternatively, the first parameter is used to indicate that a transmission path used to transmit the NAS SMP message is the path 2 in FIG. 2. The uplink NAS COUNT is the uplink NAS COUNT that corresponds to the non-3GPP access technology and that is determined by the terminal in step 1113, or an uplink NAS COUNT corresponding to the path 2. The NAS SMP message carries the uplink NAS COUNT.

After receiving the NAS SMP message, the AMF node may verify whether the uplink NAS COUNT carried in the NAS SMP message is greater than the uplink NAS COUNT that corresponds to the non-3GPP access technology and that is stored by the AMF node. Alternatively, the AMF node may verify whether the uplink NAS COUNT carried in the NAS SMP message is greater than the uplink NAS COUNT corresponding to the path 2. If the uplink NAS COUNT carried in the NAS SMP message is greater than the uplink NAS COUNT that corresponds to the non-3GPP access technology and that is stored by the AMF node, or if the uplink NAS COUNT carried in the NAS SMP message is greater than the uplink NAS COUNT corresponding to the path 2, it may be determined, based on the bit information in the NAS message, that the access technology used to transmit the NAS SMP message is the non-3GPP access technology, to determine the first parameter corresponding to the non-3GPP access technology. The AMF node may then perform integrity verification on the NAS SMP message based on the first parameter, the NAS key, and the uplink NAS COUNT carried in the NAS SMP message. If the verification succeeds, step 1115 is performed. Optionally, if the AMF stores a plurality of uplink NAS COUNTS, it may be verified whether the uplink NAS COUNT carried in the NAS SMP message is greater than the largest uplink NAS COUNT that corresponds to the non-3GPP access technology and that is stored by the AMF node.

Step 1115: The AMF node sends an N2 message to the N3IWF node. The N2 message carries a key Kn3iwf and a registration complete message.

Correspondingly, the N3IWF node receives the N2 message.

Step 1116: The N3IWF node sends an EAP-5G-Success message to the terminal.

Correspondingly, the terminal receives the EAP-5G-Success message.

Step 1117: The terminal and the N3IWF node complete calculation of an authentication parameter using the Kn3iwf.

Step 1118: An Internet Protocol (IP) Security (IPsec) connection is established between the terminal and the N3IWF node.

Step 1119: The N3IWF node sends a registration complete message to the terminal.

According to the method provided in this embodiment of this application, the terminal can access a network via the non-3GPP access technology, and can independently maintain the NAS COUNT of the 3GPP access technology and the NAS COUNT of the non-3GPP access technology, thereby reducing a possibility of occurrence of a replay attack.

In a possible implementation of this embodiment of this application, a security context of the terminal may be bound to operator information. For example, the operator information may be a PLMN ID. After the terminal accesses a network using a 3GPP access technology provided by an operator A, when the terminal executes the procedure corresponding to FIG. 11A and FIG. 11B, it may be determined whether the N3IWF node corresponding to the non-3GPP access technology is still the operator A. If the N3IWF node is still the operator A, the procedure corresponding to FIG. 11A and FIG. 11B may be continued.

In another possible implementation, a security context of the terminal on a non-3GPP access technology side may be bound to other information such as subscription information and location area information. For example, the terminal moves from a coverage range of a base station A to a coverage range of a base station B, the coverage range of the base station A supports a non-3GPP access technology C, and the base station B supports a non-3GPP access technology D. If the terminal accesses the network via the non-3GPP access technology C, when the terminal moves from the coverage range of the base station A to the coverage range of the base station B, if subscription information of the terminal indicates that the terminal does not have permission for using the non-3GPP access technology D, the terminal cannot access the network via the non-3GPP access technology D.

Optionally, in the foregoing embodiment, the AMF node may determine, based on the first indication information, an access technology used to transmit a NAS message. This embodiment of this application further provides three methods for determining an access technology used to transmit an N2 message or a NAS message after an AMF node receives the N2 message.

Method 1: The AMF node may determine, based on a source of the N2 message, the access technology used to transmit the N2 message. For example, the AMF node determines the source of the message based on source address information (for example, an IP address), and further determines, based on the source of the message, the access technology used to transmit the message. If the N2 message comes from a device via a 3GPP access technology, for example, a base station, it is determined that a NAS COUNT corresponding to the 3GPP access technology can be used.

In other words, the AMF node may verify, using an uplink NAS COUNT that corresponds to the 3GPP access technology and that is stored by the AMF node, an uplink NAS COUNT carried in the N2 message. If the N2 message comes from a device via a non-3GPP access technology, for example, an N3IWF node, it is determined that a NAS COUNT corresponding to the non-3GPP access technology may be used. In other words, the AMF node may verify, using an uplink NAS COUNT that corresponds to the non-3GPP access technology and that is stored by the AMF node, an uplink NAS COUNT carried in the N2 message.

Method 2: The terminal may notify the AMF node of a source of the N2 message in an explicit manner. For example, the N2 message may carry a bit that is used to indicate an access technology. For example, 0 represents a 3GPP access technology, and 1 represents a non-3GPP access technology. Alternatively, the N2 message may carry a character string, for example, "NR" represents a 3GPP access technology, and "wi-fi" represents a non-3GPP access technology.

Method 3: The AMF node determines, based on access type information in the N2 message, the access technology used to transmit the N2 message. For example, the access type information comprises RAT type (an access type) information. If the N2 message comes from a device using a 3GPP access technology, for example, a base station, an access type indication in the N2 message is 3GPP access, such that it is determined that a NAS COUNT corresponding to the 3GPP access technology may be used. In other words, the AMF node may verify, using an uplink NAS COUNT that corresponds to the 3GPP access technology and that is stored by the AMF node, an uplink NAS COUNT carried in the N2 message.

In comparison with other approaches in which the AMF node does not distinguish access technologies used by received messages, in the foregoing two manners in this embodiment of this application, the AMF node may determine an access technology used by a received message, to select a NAS COUNT corresponding to the access technology used by the received message.

Optionally, in another implementation provided in this embodiment of this application, with reference to the method procedure corresponding to FIG. 11A and FIG. 11B, if the AMF node determines the second uplink NAS COUNT and the first downlink NAS COUNT that correspond to the non-3GPP access technology in step 1111, the AMF node may further update the NAS key. This embodiment of this application provides four methods for updating the NAS key.

Method 1: Generate new Kamf (nKamf) using old Kamf (oKamf), and after the AMF node generates nKamf, generate a new NAS key based on nKamf.

Herein, Kamf is a root key of the AMF node.

Herein, nKamf=KDF (oKamf, a freshness parameter). The freshness parameter may be an uplink NAS COUNT previously received by the AMF node, a COUNT, a parameter sent by the terminal to the AMF node, or a parameter that is negotiated between the terminal and the AMF node.

Method 2: Generate nKamf using Kseaf, and after the AMF node generates nKamf, generate a new NAS key based on nKamf.

Herein, Kseaf is a root key of the AMF node.

Herein, nKamf=KDF (Kamf, a freshness parameter). The freshness parameter may be an uplink NAS COUNT previously received by the AMF node, or may be a COUNTer value. For example, a start value of the COUNTer value is 0, and each time the AMF node generates a NAS key, the COUNTer value is increased by 1, to indicate that the AMF node generates a new key.

Method 3: The AMF node may generate a new NAS key based on old Kamf (oKamf) and an algorithm.

Herein, nKamf=KDF (oKamf, an algorithm ID, a selected algorithm, and another parameter), and the algorithm ID is an identifier of an algorithm selected by the AMF node. The selected algorithm is an algorithm used by the terminal and the AMF node to perform security protection on a NAS message.

The other parameter is a parameter used to indicate an access technology. In some embodiments, the other parameter may be in a form of a bit or in a form of an ID. For example, it may be specified that another parameter corresponding to a 3GPP access technology is 0x01, another parameter corresponding to a non-3GPP access technology is 0x10, and another parameter corresponding to a fixed network access technology is 0x11.

The other parameter may alternatively be a counter value. For example, a start value of the counter value is 0, and each time the AMF node generates a NAS key, the counter value is increased by 1, to indicate that the AMF node generates a new key.

Method 4: Generate a new NAS key based on an old NAS key.

The new NAS key=(the old NAS key, a counter value). For example, a start value of the counter value is 0, and each time the AMF node generates a NAS key, the counter value is increased by 1, to indicate that the AMF node generates a new key.

It should be noted that if the AMF node generates a new NAS key, the AMF node may instruct, using the NAS SMC message in the embodiment corresponding to FIG. 11A and FIG. 11B, the terminal to update the key in an explicit manner. After receiving an instruction of updating the key, the terminal may update the key using one of the foregoing four methods. A method for updating a key by the terminal is the same as a method for updating a NAS key by the AMF node, and a method for updating a NAS key is pre-configured in both the AMF node and the terminal.

Optionally, when the AMF node and the terminal change a used access technology, a NAS key may be updated. Alternatively, the NAS key may be updated when a case of using a plurality of access technologies is switched to a case of using only one access technology, or when a quantity of simultaneously used access technologies is reduced.

According to this method, a key is updated. Even if an attacker obtains a NAS key used when the AMF node communicates with the terminal using a plurality of access technologies, the attacker cannot obtain a plaintext used when the terminal subsequently communicates with the AMF node using a single access technology, thereby improving security.

It should be noted that, in the embodiments of this application, an example in which a first access technology is a non-3GPP access technology and a second access technology is a 3GPP access technology is used for description. Alternatively, in other examples, the first access technology may be the 3GPP access technology, and the second access technology may be the non-3GPP access technology. The method provided in the foregoing embodiments may be used when the first access technology and the second access technology are respectively two different access technologies supported by the terminal, or the method provided in the foregoing embodiments may be used when the terminal accesses the core network device using a plurality of access technologies.

For example, if the first access technology is a fixed network access technology and the second access technology is a non-3GPP access technology, an implementation method is similar to the method described in the foregoing embodiments. The embodiment corresponding to FIG. 11A and FIG. 11B may be applied to a scenario in which the terminal has accessed the AMF node using the 3GPP access technology, and then accesses the same AMF node using the fixed network access technology. The procedure in FIG. 11A and FIG. 11B may be replaced with a registration process in which the terminal accesses an AMF node using the fixed network access technology. A security protection method in the registration process is similar to the security protection method that is described in the embodiment in FIG. 11A and FIG. 11B and in which the terminal accesses an AMF node using the non-3GPP access technology.

The foregoing mainly describes the solutions provided in the embodiments of this application from a perspective of interaction between different network elements. It may be understood that to implement the foregoing functions, the terminal and the core network device include corresponding hardware structures and/or software modules for performing the functions. With reference to the examples described in the embodiments of this application, units and algorithm steps can be implemented by hardware or a combination of hardware and computer software in the embodiments of this application. Whether a function is implemented in a hardware manner or in a manner of driving hardware by computer software depends on a particular application and a design constraint condition of the technical solutions. For each particular application, a person skilled in the art may use different methods to implement the described functions, but it should not be considered that the implementation goes beyond the scope of the technical solutions of the embodiments of this application.

In the embodiments of this application, function unit division may be performed on the terminal and the core network device based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that the unit division in the embodiments of this application is an example, and is merely logical function division and may be another division in an actual implementation of the present application.

Figure 12:
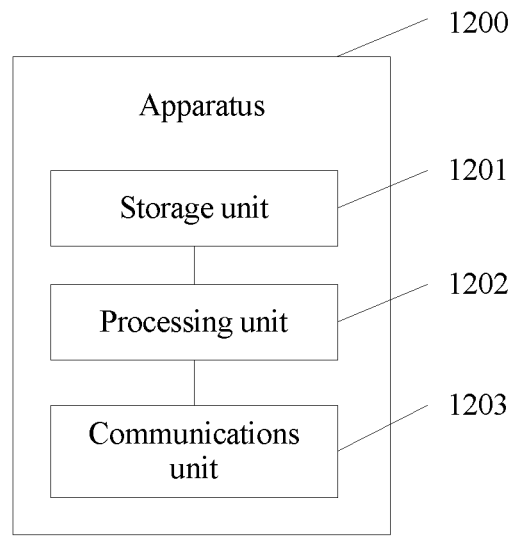
FIG. 12 is a schematic structural diagram of an apparatus according to an embodiment of this application.

When an integrated unit is used, FIG. 12 shows a schematic block diagram of an apparatus 1200 according to an embodiment of this application. The apparatus 1200 may exist in a form of software, or may be a terminal, or may be a chip in a terminal. The apparatus 1200 includes a processing unit 1202 and a communications unit 1203. The processing unit 1202 is configured to control and manage an action of the apparatus 1200. For example, the processing unit 1202 is configured to support the apparatus 1200 in performing step 501 and step 502 in FIG. 5, step 1001 in FIG. 10, step 1101, step 1105, step 1113, step 1117, and step 1118 in FIG. 11A and FIG. 11B, and/or another process of the technology described in this specification. The communications unit 1203 is configured to support communication between the apparatus 1200 and another network element (such as a core network device and an N3IWF node). For example, the communications unit 1203 is configured to support the apparatus 1200 in performing step 1002, step 1003, and step 1007 in FIG. 10, and step 1102, step 1103, step 1104, step 1106, step 1112, step 1114, step 1116, and step 1119 in FIG. 11A and FIG. 11B. The apparatus 1200 may further include a storage unit 1201, configured to store program code and data of the apparatus 1200.

The processing unit 1202 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1202 may implement or execute various examples of logical blocks, modules, and circuits described with reference to content disclosed in this application. Alternatively, the processor may be a combination for implementing a computing function, for example, a combination of one or more microprocessors or a combination of the DSP and a microprocessor. The communications unit 1203 may be a transceiver, a transceiver circuit, a communications interface, or the like. The storage unit 1201 may be a memory.

Figure 13:
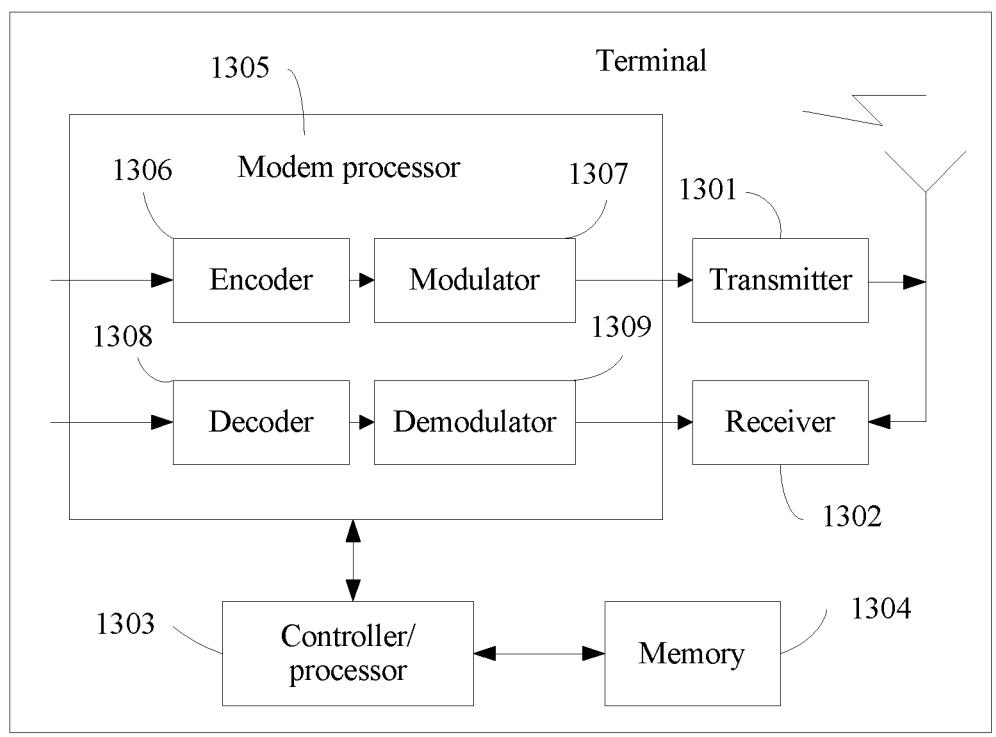
FIG. 13 is a schematic structural diagram of a terminal according to an embodiment of this application.

When the processing unit 1202 is a processor, the communications unit 1203 is a transceiver, and the storage unit 1201 is a memory, the apparatus 1200 in this embodiment of the present disclosure may be a terminal shown in FIG. 13.

FIG. 13 shows a simplified schematic diagram of a possible design structure of a related terminal 1300 according to an embodiment of this application. The terminal 1300 includes a transmitter 1301, a receiver 1302, and a processor 1303. The processor 1303 may alternatively be a controller, and is indicated as a "controller/processor 1303" in FIG. 13. Optionally, the terminal 1300 may further include a modem processor 1305, and the modem processor 1305 may include an encoder 1306, a modulator 1307, a decoder 1308, and a demodulator 1309.

In an example, the transmitter 1301 adjusts (for example, through analog conversion, filtering, amplification, and up-conversion) an output sample and generates an uplink signal. The uplink signal is transmitted to the base station in the foregoing embodiments using an antenna. On a downlink, the antenna receives a downlink signal transmitted by the base station in the foregoing embodiment. The receiver 1302 adjusts (for example, through filtering, amplification, down-conversion, and digitization) a signal received from the antenna and provides an input sample. In the modem processor 1305, the encoder 1306 receives service data and a signaling message that are to be sent on an uplink, and processes (for example, through formatting, coding, and interleaving) the service data and the signaling message. The modulator 1307 further processes (for example, through symbol mapping and modulation) coded service data and a coded signaling message, and provides an output sample. The demodulator 1309 processes (for example, through demodulation) the input sample and provides symbol estimation. The decoder 1308 processes (for example, through de-interleaving and decoding) the symbol estimation and provides decoded data and a decoded signaling message that are to be sent to the terminal 1300. The encoder 1306, the modulator 1307, the demodulator 1309, and the decoder 1308 may be implemented by the integrated modem processor 1305. The units perform processing based on a radio access technology (for example, access technologies of LTE and another evolved system) used in a radio access network. It should be noted that when the terminal 1300 does not include the modem processor 1305, the foregoing functions of the modem processor 1305 may alternatively be implemented by the processor 1303.

The processor 1303 controls and manages an action of the terminal 1300, and is configured to execute processing processes performed by the terminal 1300 in the foregoing embodiments of this application. For example, the processor 1303 is further configured to execute a processing process related to a terminal in the method shown in FIG. 5, FIG. 10, and FIG. 11A and FIG. 11B, and/or another process of the technical solutions described in this application.

Further, the terminal 1300 may further include a memory 1304, and the memory 1304 is configured to store program code and data used for the terminal 1300.

Figure 14:
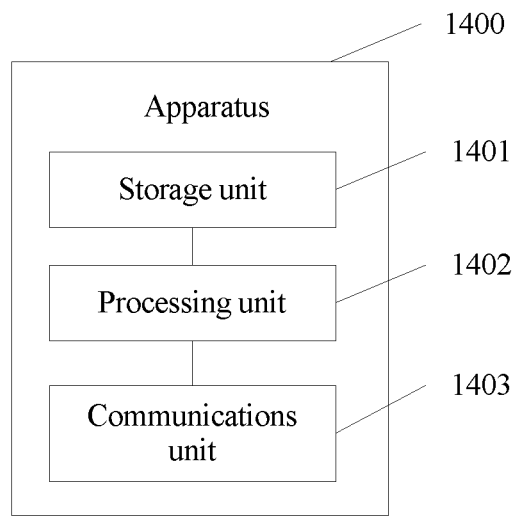
FIG. 14 is a schematic structural diagram of another apparatus according to an embodiment of this application.

When an integrated unit is used, FIG. 14 shows a schematic block diagram of another apparatus 1400 according to an embodiment of this application. The apparatus 1400 may exist in a form of software, or may be a core network device, or may be a chip in a core network device. The apparatus 1400 includes a processing unit 1402 and a communications unit 1403. The processing unit 1402 is configured to control and manage an action of the apparatus 1400. For example, the processing unit 1402 is configured to support the apparatus 1400 in performing step 901 and step 902 in FIG. 9, step 1004 to step 1006 in FIG. 10, step 1109 to step 1111 in FIG. 11A and FIG. 11B, and/or another process of the technology described in this specification. The communications unit 1403 is configured to support communication between the apparatus 1400 and another network element (such as a terminal or an N3IWF node). For example, the communications unit 1403 is configured to support the apparatus 1400 in performing step 1001, step 1002, and step 1007 in FIG. 10, and step 1108, step 1112, step 1114, and step 1115 in FIG. 11A and FIG. 11B. The apparatus 1400 may further include a storage unit 1401, configured to store program code and data of the apparatus 1400.

The processing unit 1402 may be a processor or a controller, for example, a CPU, a general-purpose processor, a DSP, an ASIC, an FPGA or another programmable logic device, a transistor logic device, a hardware component, or any combination thereof. The processing unit 1402 may implement or execute various example logical blocks, modules, and circuits described with reference to content disclosed in this application. Alternatively, the processor 1402 may be a combination for implementing a computing function, for example, a combination of one or more microprocessors or a combination of the DSP and a microprocessor. The communications unit 1403 may be a communications interface. The communications interface is a general name. In some implementations, the communications interface may include a plurality of interfaces. For example, the communications interface may include an interface between a core network device and a terminal, and an interface between a core network device and an N3IWF node, and/or another interface. The storage unit 1401 may be a memory.

Figure 15:
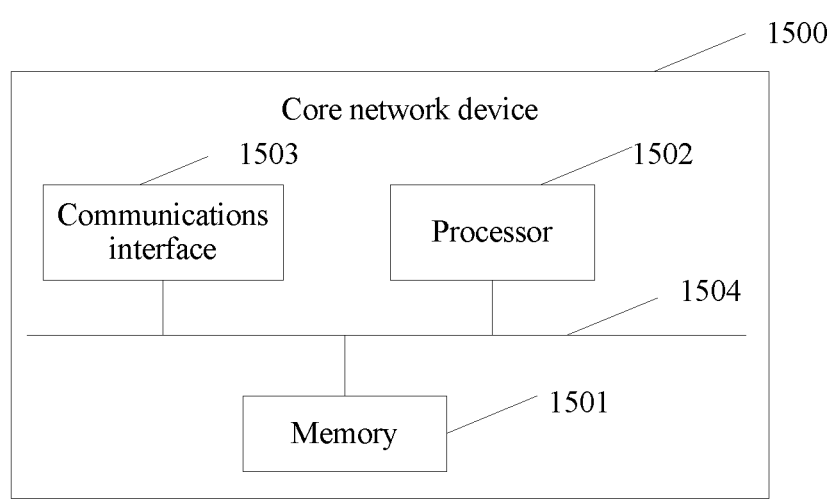
FIG. 15 is a schematic structural diagram of a core network device according to an embodiment of this application.

When the processing unit 1402 is a processor, the communications unit 1403 is a communications interface, and the storage unit 1401 is a memory, a structure of the apparatus 1400 in this embodiment of the present disclosure may be a structure of a network device shown in FIG. 15.

FIG. 15 shows a possible schematic structural diagram of a core network device according to an embodiment of this application.

As shown in FIG. 15, a core network device 1500 includes a processor 1502, a communications interface 1503, and a memory 1501. Optionally, the core network device 1500 may further include a bus 1504. The communications interface 1503, the processor 1502, and the memory 1501 may be connected to each other using the bus 1504. The bus 1504 may be a PCI bus, an EISA bus, or the like. The bus 1504 may be classified into an address bus, a data bus, a control bus, and the like. For ease of indication, the bus 1504 is indicated using only one bold line in FIG. 15. However, it does not indicate that there is only one bus or only one type of bus.

The methods or algorithm steps described with reference to the content disclosed in this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, such that the processor can read information from the storage medium, and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation of the present application. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, in other words, may be located in one position, or may be distributed on a plurality of network devices. Some or all of the units may be selected according to actual needs to achieve the objectives of the solutions of the embodiments.

In addition, functional units in the embodiments of the present disclosure may be integrated into one processing unit, or each of the functional units may exist alone, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to universal hardware or certainly by hardware only. In most cases, the former is a preferred implementation. Based on such an understanding, the technical solutions of this application essentially or the part contributing to other approaches may be implemented in a form of a software product. The computer software product is stored in a readable storage medium, such as a floppy disk, a hard disk, or an optical disc of a computer, and includes several instructions for instructing a computer device (which may be a personal computer, a server, or a network device) to perform the methods described in the embodiments of this application.

The foregoing descriptions are merely example embodiments of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. A method of security protection for a non-access stratum (NAS) message by an apparatus in a communication system, wherein the method comprises:
   determining a type of access technology used for transmitting the NAS message;
   determining a value of a first parameter according to the type of access technology used for transmitting the NAS message, wherein the value of the first parameter indicates the type of access technology used for transmitting the NAS message; and
   performing security protection for the NAS message based on a NAS key, the first parameter, and a COUNT, wherein the COUNT is set according to the type of access technology used for transmitting the NAS message.

2. The method of claim 1, wherein performing security protection for the NAS message comprises performing an encryption process or a decryption process for the NAS message using the NAS key, a BEARER, and the COUNT as input parameters, wherein bits of the BEARER represent the value of the first parameter.

3. The method of claim 1, wherein the type of access technology used for transmitting the NAS message comprises a 3rd Generation Partnership Project (3GPP) access technology, and wherein the value of the first parameter indicates the 3GPP access technology.

4. The method of claim 1, wherein the type of access technology used for transmitting the NAS message comprises a non-3rd Generation Partnership Project (non-3GPP) access technology, and wherein the value of the first parameter indicates the non-3GPP access technology.

5. The method of claim 1, wherein the COUNT includes 32 bits, wherein 8 most significant bits of the COUNT are set to a value of 0, and wherein 24 remaining bits of the COUNT are set to a value of a NAS COUNT associated with the type of access technology used for transmitting the NAS message.

6. The method of claim 1, wherein after performing the security protection for the NAS message, the method further comprises sending the NAS message via the type of access technology used for transmitting the NAS message, wherein the NAS message includes some bits of the COUNT.

7. The method of claim 1, wherein determining the value of the first parameter comprises determining the value of the first parameter according to a configuration, wherein the configuration indicates that the first parameter is set to a first value if the type of access technology used for transmitting the NAS message is a 3rd Generation Partnership Project (3GPP) access technology.

8. An apparatus, comprising:
   at least one processor; and
   a memory coupled to the processor and having program instructions stored thereon which, when executed by the at least one processor, cause the apparatus to:
      determine a type of access technology used for transmitting a NAS message;
      determine a value of a first parameter according to the type of access technology used for transmitting the NAS message, wherein the value of the first parameter indicates the type of access technology used for transmitting the NAS message; and
      perform security protection for the NAS message based on a NAS key, the first parameter, and a COUNT, wherein the COUNT is set according to the type of access technology used for transmitting the NAS message.

9. The apparatus of claim 8, wherein the program instructions that cause the apparatus to perform security protection for the NAS message include instructions that cause the apparatus to perform an encryption process or a decryption process for the NAS message using the NAS key, a BEARER, and the COUNT as input parameters, and wherein bits of the BEARER represent the value of the first parameter.

10. The apparatus of claim 8, wherein the type of access technology used for transmitting the NAS message comprises a 3rd Generation Partnership Project (3GPP) access technology, and wherein the value of the first parameter indicates the 3GPP access technology.

11. The apparatus of claim 8, wherein the type of access technology used for transmitting the NAS message comprises a non-3rd Generation Partnership Project (non-3GPP) access technology, and wherein the value of the first parameter indicates the non-3GPP access technology.

12. The apparatus of claim 8, wherein the COUNT includes 32 bits, wherein 8 most significant bits of the COUNT are set to a value of 0, and wherein 24 remaining bits of the COUNT are set to a value of a NAS COUNT associated with the type of access technology used for transmitting the NAS message.

13. The apparatus of claim 8, wherein the program instructions, when executed by the processor, further cause the apparatus to send the NAS message via the type of access technology used for transmitting the NAS message, and wherein the NAS message includes some bits of the COUNT.

14. The apparatus of claim 8, wherein the program instructions further cause the apparatus to determine the value of the first parameter according to a configuration, wherein the configuration indicates that the first parameter is set to a first value if the type of access technology used for transmitting the NAS message is a 3rd Generation Partnership Project (3GPP) access technology.

15. The apparatus of claim 8, wherein the apparatus is a terminal device or a chip in the terminal device.

16. The apparatus of claim 8, wherein the apparatus is an access and mobility management function (AMF) node.

17. A computer program product embodied on a non-transitory computer readable storage medium, wherein the computer program product comprises instructions which, when executed by a computer cause the computer to:
   determine a type of access technology used for transmitting a NAS message;
   determine a value of a first parameter according to the type of access technology used for transmitting the NAS message, wherein the value of the first parameter indicates the type of access technology used for transmitting the NAS message; and perform security protection for the NAS message based on a NAS key, the first parameter, and a COUNT, wherein the COUNT is set according to the type of access technology used for transmitting the NAS message.

18. The computer program product of claim 17, wherein the instructions further cause the computer to perform an encryption process or a decryption process for the NAS message using the NAS key, a BEARER, and the COUNT as input parameters, and wherein bits of the BEARER represent the value of the first parameter.

19. The computer program product of claim 17, wherein the COUNT includes 32 bits, wherein 8 most significant bits of the COUNT are set to a value of 0, and wherein 24 remaining bits of the COUNT are set to a value of a NAS COUNT associated with the type of access technology used for transmitting the NAS message.

20. The computer program product of claim 17, wherein the instructions further cause the computer to determine the value of the first parameter according to a configuration, wherein the configuration indicates that the first parameter is set to a first value if the type of access technology used for transmitting the NAS message is a 3rd Generation Partnership Project (3GPP) access technology.

21. The method of claim 1, wherein performing security protection for the NAS message comprises performing an integrity protection process or an integrity protection verification process for the NAS message using the NAS key, a BEARER, and the COUNT as input parameters, and wherein bits of the BEARER represent the value of the first parameter.

22. The method of claim 1, wherein determining the value of the first parameter comprises determining the value of the first parameter according to a configuration, wherein the first parameter is set to a second value if the type of access technology used for transmitting the NAS message is a non-3rd Generation Partnership Project (non-3GPP) access technology.

23. The apparatus of claim 8, wherein the program instructions that cause the apparatus to perform security protection for the NAS message include instructions that cause the apparatus to perform an integrity protection process or an integrity protection verification process for the NAS message using the NAS key, a BEARER, and the COUNT as input parameters, and wherein bits of the BEARER represent the value of the first parameter.

24. The apparatus of claim 8, wherein the program instructions further cause the apparatus to determine the value of the first parameter according to a configuration, and wherein the configuration indicates that the first parameter is set to a second value if the type of access technology used for transmitting the NAS message is a non-3rd Generation Partnership Project (non-3GPP) access technology.

25. The computer program product of claim 17, wherein the instructions further cause the computer to perform an integrity protection process or an integrity protection verification process for the NAS message using the NAS key, a BEARER, and the COUNT as input parameters, and wherein bits of the BEARER represent the value of the first parameter.

26. The computer program product of claim 17, wherein the instructions further cause the computer to determine the value of the first parameter according to a configuration, wherein the configuration indicates that the first parameter is set to a second value if the type of access technology used for transmitting the NAS message is a non-3rd Generation Partnership Project (non-3GPP) access technology.

* * * * *